United States Patent
Tang et al.

(10) Patent No.: US 6,839,348 B2
(45) Date of Patent: * Jan. 4, 2005

(54) SYSTEM AND METHOD FOR DISTRIBUTING MULTICASTS IN VIRTUAL LOCAL AREA NETWORKS

(75) Inventors: Cheng Tang, San Jose, CA (US); Chickayya G. Naik, San Jose, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/303,296

(22) Filed: Apr. 30, 1999

(65) Prior Publication Data

US 2003/0165140 A1 Sep. 4, 2003

(51) Int. Cl.[7] .......................... H04L 12/28; H04L 12/56
(52) U.S. Cl. ....................... 370/390; 370/401; 370/392; 370/432
(58) Field of Search .................. 370/401, 389, 370/392, 400, 402, 403–406, 390, 351, 412–418, 432

(56) References Cited

U.S. PATENT DOCUMENTS

| | | | |
|---|---|---|---|
| 4,821,265 A | 4/1989 | Albal et al. | 370/110.1 |
| 4,864,559 A | 9/1989 | Perlman | 370/60 |
| 4,893,302 A | 1/1990 | Hemmady et al. | 370/60 |
| 4,933,937 A | 6/1990 | Konishi | 370/85.13 |
| 5,018,137 A | 5/1991 | Backes et al. | 370/85.13 |
| 5,027,350 A | 6/1991 | Marshall | 370/85.13 |

(List continued on next page.)

OTHER PUBLICATIONS

*Cisco 7000 Series Gains Fast Ethernet Interface, Becomes Only Router Family to Support Three High–Speed Network Types*, web, http://www.cisco.com/warp/public/146/199.html pp. 1–2.

(List continued on next page.)

*Primary Examiner*—Seema S. Rao
*Assistant Examiner*—Ronald Abelson
(74) *Attorney, Agent, or Firm*—Cesari and McKenna, LLP; A. Sidney Johnston

(57) ABSTRACT

The invention relates to a system and method for efficiently distributing multicast messages within computer networks configured to have one or more virtual local area network (VLAN) domains. A multicast network device (MND), having a plurality of interfaces, includes a multicast controller for efficiently distributing multicast messages among subscribing entities associated with various VLAN domains. The multicast controller, which is in communicating relationship with the interfaces, includes a VLAN assignment engine for assigning responsibility for the VLAN domains to the extent there are multiple MNDs. The multicast controller also accesses a multicast tag source to establish a plurality of novel VLAN tags for efficiently distributing multicast messages, including a sub-regional Multicast VLAN Identifier (MVLAN-ID) that encompasses all of the VLAN domains for which the respective MND is responsible, and one or more color-limited MVLAN-IDs that encompass all of the VLAN domains for which the MND is responsible except for one. The multicast controller then tags multicast messages with its sub-regional or a color-limited MVLAN-ID depending on whether the message is considered internal or external by the respective MND. The tagged messages are then forwarded for distribution to the subscribers associated with the various VLAN domains.

18 Claims, 6 Drawing Sheets

U.S. PATENT DOCUMENTS

| | | | | |
|---|---|---|---|---|
| 5,088,032 A | | 2/1992 | Bosack | 395/200 |
| 5,138,615 A | | 8/1992 | Lamport et al. | 370/94.3 |
| 5,140,585 A | | 8/1992 | Tomikawa | 370/60.1 |
| 5,274,631 A | | 12/1993 | Bhardwaj | 370/60 |
| 5,304,992 A | | 4/1994 | Harashima | 340/825.52 |
| 5,305,311 A | | 4/1994 | Lyles | 370/60 |
| 5,313,454 A | | 5/1994 | Bustini et al. | 370/13 |
| 5,361,256 A | | 11/1994 | Doeringer et al. | 370/60 |
| 5,394,394 A | | 2/1995 | Crowther et al. | 370/60 |
| 5,394,402 A | | 2/1995 | Ross | 370/94.1 |
| 5,414,704 A | | 5/1995 | Spinney | 370/60 |
| 5,418,779 A | | 5/1995 | Yemini et al. | 370/54 |
| 5,420,862 A | | 5/1995 | Perlman | 370/85.13 |
| 5,430,715 A | | 7/1995 | Corbalis et al. | 370/54 |
| 5,473,607 A | | 12/1995 | Hausman et al. | 370/85.13 |
| 5,500,860 A | | 3/1996 | Perlman et al. | 370/85.13 |
| 5,511,168 A | | 4/1996 | Perlman et al. | 395/200.15 |
| 5,548,585 A | | 8/1996 | Lagoutte et al. | 370/60 |
| 5,600,644 A | * | 2/1997 | Chang et al. | 370/404 |
| 5,612,959 A | | 3/1997 | Takase et al. | 370/390 |
| 5,617,421 A | | 4/1997 | Chin et al. | 370/402 |
| 5,633,858 A | | 5/1997 | Chang et al. | 370/255 |
| 5,633,869 A | | 5/1997 | Burnett et al. | 370/396 |
| 5,636,216 A | | 6/1997 | Fox et al. | 370/402 |
| 5,673,263 A | | 9/1997 | Basso et al. | 370/396 |
| 5,684,800 A | | 11/1997 | Dobbins et al. | 370/401 |
| 5,740,171 A | | 4/1998 | Mazzola et al. | 370/392 |
| 5,742,604 A | | 4/1998 | Edsall et al. | 370/401 |
| 5,752,003 A | | 5/1998 | Hart | 395/500 |
| 5,754,547 A | | 5/1998 | Nakazawa | 370/401 |
| 5,764,636 A | | 6/1998 | Edsall | 370/401 |
| 5,796,732 A | | 8/1998 | Mazzola et al. | 370/362 |
| 5,796,740 A | | 8/1998 | Perlman et al. | 370/401 |
| 5,835,720 A | | 11/1998 | Nelson et al. | 395/200.54 |
| 5,854,901 A | | 12/1998 | Cole et al. | 395/200.75 |
| 5,901,286 A | | 5/1999 | Danknick et al. | 395/200.33 |
| 5,910,955 A | | 6/1999 | Nishimura et al. | 370/401 |
| 5,946,308 A | * | 8/1999 | Dobbins et al. | 370/392 |
| 5,959,989 A | * | 9/1999 | Gleeson et al. | 370/390 |
| 5,968,126 A | | 10/1999 | Ekstrom et al. | 709/225 |
| 5,982,773 A | | 11/1999 | Nishimura et al. | 370/395 |
| 5,999,536 A | | 12/1999 | Kawafuji et al. | 370/401 |
| 6,055,236 A | | 4/2000 | Nessett et al. | 370/389 |
| 6,466,985 B1 | * | 10/2002 | Goyal et al. | 709/238 |
| 6,539,015 B2 | * | 3/2003 | Voit | 370/389 |
| 2002/0191584 A1 | * | 12/2002 | Korus et al. | 370/349 |
| 2003/0018715 A1 | * | 1/2003 | O'Neill | 709/204 |

OTHER PUBLICATIONS

*ISL Functional Specification*, web, http://www.cisco.com/warp/public/741/4.htm, pp. 1–4.
*Configuring VTP and Virtual LANs*, Catalyst 5000 Series Software Configuration Guide, Chapter 13, pp. 13–24.
"IP Multicast Streamlines Delivery of multicast Applications," http://www.cisco.com/warp/public/674/4.html, pp. 1–4, posted Feb. 24, 1998.
"Cisco Announces New Fast Ethernet Interface," Communications Industry Researchers, Broadband Networks and Applications, Apr. 15, 1995.
Lucent Technologies, Inc.'s Initial Disclosure of Prior Art under Civil Local Rule 16–7, dated Nov. 18, 1998.
"Cisco Introduces VLAN Solution," Communications Industry Researchers, Broadband Networks and Applications, Apr. 15, 1995.
"Cisco Announces Token–Ring Switching Products," Communications Industry Researchers, Broadband Networks and Applications, Apr. 15, 1995.
Chipcom and Cisco To Collaborate on ATM Networking Solutions, Communications Industry Researchers, Broadband Networks and Applications, Apr. 15, 1995.
"Cisco VLAN Roadmap", http://www.cisco.com/warp/public/538/7.html, pp. 1–9, posted Jul. 17, 1995.
"Cisco Catalyst Workgroup Switch Version 3.0," http://www.cisco.com/warp/public/558/16.html, pp. 1–5, posted Aug. 29, 1994.
"Virtual Networking Services," http://www.cisco.com/warp/public/614/5.html, pp. 1–10, posted Oct. 28, 1997.
"The Virtual LAN Technology Report," http://www.3com.com/nsc/200374.html, pp. 1–19, 1998.
"ATM Internetworking," http://www.cisco.com/warp/public/614/12,html#LANE, pp. 1–58, posted Jun. 1, 1995.
Lucent's and prominet's Motion for Leave To Amend Their Amended Complaint, with Exhibits being filed in Lucent Technologies, Inc. and Prominet Corporation v. Cisco Systems, Inc. and Cisco Technology, Inc.Civil Action No. 98/349 (JJF).
"Catalyst 1200 Release 4.0," http://www.cisco.com/warp/public/558/49.html, pp. 1–7, posted May 18, 1995.
"Cisco IOS VLAN Services," http://www.cisco.com/warp/public/614/11.html, pp. 1–3, posted Jan. 21, 1998.
"Cisco IOS Technology," http://www.cisco.com/warp/public/732/ciscoios.html, pp. 1–2, 1997.
"Cisco LAN Switching Products," http://www.cisco.com/warp/public/534/16.html, pp. 1–21, posted Mar. 31, 1995.
"Multicast Routing," http://www.cisco.com/warp/public/614/17.html, pp. 1–3, posted Aug. 3, 1995.
Cisco 7000 Series Gains Fast Ethernet Interface, Becomes Only Router Family to Support Three High–Speed Network Types,web, http://www.cisco.com/warp/public/146/199.html pp. 1–2.
ISL Functional Specification, web, http://www.cisco.com/warp/public/741/4.htm, pp. 1–4.
Configuring VTP and Virtual LANs, Catalyst 5000 Series Software Configuration Guide, Chapter 13, pp. 13–24.
IEEE Standard Project P802.IQ,Draft Standard for Virtual Bridged Local Area networks, Copyright by the Institute of Electrical and Electronics Engineers, Inc., Feb. 28, 1997, pp. 1–88.
Draft Standard P. 802.1Q/D10, IEEE Standards for Local and Metropolitan Area Networks: Virtual Bridged Local Area Networks, Copyright by the Institute of Electrical and Electronics Engineers, Inc., Mar. 22, 1998, pp. 1–212.
ISL Configurations for Cisco IOS and the Catalyst 5000, web, http://www.cisco.com/warp/public/741/8.html, pp. 1–8.
Dynamic Inter–Switch Link Protocol, 2.2 Configuration Note, pp. 2–6.
Virtual LANs, Catalyst 2820 Series and Catalyst 1900 Series Enterprise Edition Software Configuration Guide, Chapter 2, pp. 2–1–2–49.
IEEE, "Draft Standard for Virtual Bridged Local Area Networks," pp. 1–10 and 70–72 (May 1997).
Deering, S., and Cheriton, D., "Multicast Routing in Datagram Internetworks and Extended LANs," vol. 8, ACM Transactions on Computer Systems, pp. 85–110 (May 1990).
Deering, S. et al., "An Architecture for Wide–Area Multicast Routing," Proceedings of SIGCOMM '94 Conf., ACM, pp. 126–135 (Oct. 1994).

* cited by examiner

| VLAN 502 | NUMBER OF CORRESPONDING GROUP ADDRESSES 504 |
|---|---|
| MULTICAST GROUP ADDRESS 1 | 506a |
| MULTICAST GROUP ADDRESS 2 | 506b |
| MULTICAST GROUP ADDRESS 3 | 506c |
| . . . | |
| MULTICAST GROUP ADDRESS N | 506n |

SYSTEM AND METHOD FOR DISTRIBUTING MULTICASTS IN VIRTUAL LOCAL AREA NETWORKS

CROSS-REFERENCE TO RELATED APPLICATIONS

This application is related to the following commonly-owned U.S. Patent:

U.S. Pat. No. 5,959,989 entitled, SYSTEM FOR EFFICIENT MULTICAST DISTRIBUTION IN A VIRTUAL LOCAL AREA NETWORK, issued Sep. 28, 1999.

FIELD OF THE INVENTION

The present invention relates generally to the field of computer networks, and more specifically, to the efficient distribution of multicast messages in computer networks having virtual local area network associations.

BACKGROUND OF THE INVENTION

Organizations, including businesses, governments and educational institutions, rely on computer networks to share and exchange information. A computer network typically comprises a plurality of entities interconnected by a communications media. An entity may consist of any device, such as a computer, that sources (i.e., transmits) and/or receives messages over the communications media. A common type of computer network is a local area network ("LAN") which typically refers to a privately owned network within a single building or campus. LANs typically employ a data communication protocol (LAN standard), such as Ethernet, FDDI or Token Ring, that defines the functions performed by the data link and physical layers of a communications architecture (i.e., a protocol stack).

In many instances, several LANs may be interconnected by point-to-point links, microwave transceivers, satellite hook-ups, etc. to form a wide area network ("WAN") or subnet that may span an entire city, country or continent. One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs. Typically, the bridge or switch is a computer that includes a plurality of ports which may be coupled to the LANs. Ports used to couple switches to each other are generally referred to as a trunk ports, whereas ports used to couple switches to LANs or end stations are generally referred to as access ports. The switching function includes receiving data from a sending entity at a source port and transferring that data to at least one destination port for forwarding to a receiving entity.

Another intermediate network device is referred to as a router. A router is often used to interconnect LANs executing different LAN standards and/or to provide higher functionality than bridges or switches. To perform these tasks, a router, which is also a computer having a plurality of ports, typically examines the destination address and source address of all messages passing through the router. Routers typically operate at the network layer of the protocol stack, such as the Internet Protocol (IP) layer of the Transmission Control Protocol/Internet Protocol (TCP/IP) reference model. Furthermore, if the LAN standards associated with the source entity and the destination entity are dissimilar (e.g., Ethernet and Token Ring), the router may also alter the format of the packet so that it may be received by the destination entity. Routers also execute one or more routing protocols or algorithms, which are used to determine where network messages are to be sent.

Virtual Local Area Networks

A computer network may also be segregated into a series of logical network segments. U.S. Pat. No. 5,394,402, issued Feb. 28, 1995 (the "'402 Patent"), for example, discloses an arrangement for associating any port of a switch with any particular segregated network group. Specifically, according to the '402 Patent, any number of physical ports of a particular switch may be associated with any number of groups within the switch by using a virtual local area network (VLAN) arrangement that virtually associates the port with a particular VLAN designation. More specifically, the '402 Patent discloses a switch or hub that associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received, In many cases, it may be desirable to interconnect a plurality of these switches in order to extend the VLAN associations of ports in the network. The '402 Patent, in fact, states that an objective of its VLAN arrangement is to allow all ports and entities of the network having the same VLAN designation to exchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment or domain. For convenience, each VLAN designation is often associated with a different color, such as red, blue, green, etc.

In addition to the '402 Patent, the Institute of Electrical and Electronics Engineers (IEEE) has promulgated the 802.1Q standard for Virtual Bridged Local Area Networks.

The 802.1Q standard, among other things, defines a specific VLAN-tagged message format.

Multi-casting

Computer networks generally support the forwarding and distribution of three basic message types. Messages sent from a first network entity to a second network entity are referred to as unicast messages. Messages sent from one network entity but received by all entities within a particular bridged or network domain are referred to as broadcast messages. Messages sent from one entity and received by many (but not all) entities within a network domain are referred to as multicast messages. IP protocol of the TCP/IP Reference Model defines five classes of IP addresses. Class D IP addresses, which begin with the bit sequence "1110", are used for sourcing multicast messages. That is, a host or entity wishing to send a multicast message utilizes a class D IP address. To receive multicast messages, entities typically register with one or more multicast routers. Registration may be accomplished via the Internet Group Management Protocol (IGMP), which defines a set of registration messages and operations that are used by entities to join and leave multicast groups (e.g., JoinGroup and LeaveGroup), and is implemented as part of the IP protocol.

To limit the traffic caused by registration messages, only one entity per LAN typically transmits such a request. Other interested entities listen in on the requests of their neighbors and rely on the first subscription request, rather than making their own individual requests, to ensure that messages are delivered to their LAN. Bridges and switches may perform additional filtering so that multicast routers receive only one subscription request per router interface. In particular, bridges and switches may be configured to monitor the IGMP messaging between subscribing entities and multicast routers to learn which of their ports lead either to a multicast router or to at least one entity subscribing to a particular multicast group address. This configuration is referred to as IGMP snooping.

To distribute multicast messages, routers may employ a multicast routing algorithm, such as multicast open shortest path first (MOSPF) or distance vector multicast routing protocol (DVMRP). With MOSPF and DVMRP, routers construct a spanning tree per multicast group address that basically includes all group members. The routers then build multicast forwarding tables for use in distributing multicast messages. DVMRP, in particular, creates an overlay topology on top of the computer network consisting of several multicast-capable islands interconnected by tunnels. Upon receipt of a multicast message, both MOSPF and DVMRP utilize a multicast forwarding algorithm, such as reverse path forwarding (RPF), to determine whether the message should be forwarded. In response to receiving a multicast message from a particular source, a multicast router using RPF first determines which interface it uses to send unicast messages to the source. If the multicast message was received on the same interface used to send unicast messages, the router forwards the multicast message onto those interfaces that are coupled to subscribers of the message. If the multicast message is received on an interface other than the one used to reach the source, the router discards the message as it is probably a duplicate of a message already forwarded by the router.

More recently, the Network Working Group of the Internet Engineering Task Force (IETF) is working on a technique for distributing multicast messages that use standard unicast routing tables instead of creating an overlay topology. The IETF approach is called Protocol Independent Multicast (PIM), because it is independent of the unicast routing protocol implemented by any given router utilizing it. PIM operates in one of two modes: Sparse Mode (where sources and subscribers are few in number and widely distributed) and Dense Mode (where sources and subscribers are closely packed). In Dense Mode, a router assumes that all other routers want multicast messages received by the first router, and, as a result, it forwards the multicast to all routers. To stop receipt of a particular multicast stream, a router must send a PIM Prune message toward the source. In Sparse Mode, a router assumes that other routers do not want copies of multicast messages, unless it has received specific Join requests for such messages. The routers also build a shared multicast distribution tree centered at a Rendezvous Point. Multicast messages are tunneled from the source to the Rendezvous Point which then distributes the messages to the subscribers along the shared tree. For sources whose multicast transmission rate is high, routers can also build source-specific trees by issuing Join/Prune messages.

Multicast messages can also be distributed within VLAN networks. That is, entities associated with one or more VLAN designations may subscribe to one or more multicast message streams. Similarly, entities associated with one or more VLAN designations may source multicast messages. Since bridges and switches are typically configured to respect VLAN boundaries, they typically do not bridge or switch messages, including multicast messages, from one VLAN domain to another (e.g., from the red VLAN to the blue VLAN). Only multicast routers, which typically consider VLAN domains as separate subnetworks ("subnets"), are capable of transferring multicast messages from one VLAN designation to another. Thus, to the extent multicast subscribers and sourcing entities are associated with more than one VLAN designation, such messages must be forwarded to and replicated by one or more multicast routers.

In particular, conventional multicast routers define a separate interface for each VLAN domain to which they are coupled. When a multicast message is received on an incoming interface, the router replicates it onto the outgoing interface(s) identified by its routing tables. In effect, the router creates a separate copy of the message for each of the VLAN designations (other than the VLAN designation of the entity sourcing the multicast message) in order to deliver multicast messages to subscribers of diverse VLAN designations. For example, suppose entities associated with the red, blue, green and yellow VLAN designations all subscribe to the same multicast group address and that an entity associated with the red VLAN designation sources one or more such messages. By listening to IGMP messages, bridges and switches' can distribute such multicast messages to all subscribers that share the same VLAN designation as the sourcing entity (e.g., red). In order to distribute the messages to the subscribers associated with the blue, green and yellow VLAN designations, however, each message must be processed by the multicast router. In particular, the multicast router replicates the message onto each of the blue, green and yellow VLAN interfaces, basically tagging each copy with a different VLAN designation. Each tagged copy is then sent out on the network by the multicast router. Bridges and switches then distribute these messages to the subscribers associated with the respective VLAN designations, since the VLAN designations of the copies now match the remaining subscribers.

Although this arrangement can deliver multicast messages to entities associated with diverse VLAN designations, it has several disadvantages. First, it requires that numerous copies of each multicast message be made and distributed across the network (i.e., one per subscribing VLAN designation). In addition, to the extent a multicast router is coupled to the network by a single trunk link, each copy must be carried on this one link. Depending on the number of VLAN designations associated with a given multicast message, this may severely compromise the throughput on this trunk link. In addition, the replication of multicast messages, which must then be distributed by the bridges and switches, consumes valuable network bandwidth as well as processor and memory resources. As a result, network performance may suffer.

Discussion of Related System

An improvement to the conventional distribution of multicast messages in VLAN networks is disclosed in co-pending and commonly owned application Ser. No. 08/882,632 entitled, SYSTEM FOR EFFICIENT MULTICAST DISTRIBUTION IN A VIRTUAL LOCAL AREA NETWORK, filed Jun. 25, 1997 (the "'632 System"). With the '632 System, a multicast router creates one or more Multicast VLAN identifiers (MVLAN-IDs) for use in distributing multicast messages sourced from a particular VLAN designation. The MVLAN-ID encompasses all of the VLAN designations associated with subscribing entities, except for the VLAN designation of the entity that sourced the message. Accordingly, when a multicast message is received, rather than create multiple copies that are tagged with the individual VLAN designations associated with the subscribing entities, the multicast router creates a single copy of the message and appends to it the corresponding MVLAN-ID. Bridges and switches within the network associate their ports previously associated with just the subscribing VLAN designations (other than the VLAN designation associated with the source of the message) with the new MVLAN-ID as well. Bridges and switches are thus able to distribute this single copy of the multicast message to the remaining subscribers.

Although it represents a significant improvement over the conventional multicast distribution methods, the '632 System can result in the creation of a substantial number of MVLAN-IDs depending on the number of entities sourcing messages to a given multicast group address and their VLAN associations. Additionally, to the extent a multicast message received from outside a VLAN network is to be distributed to multiple VLAN designations within the VLAN network, the '632 System may still require multiple copies of the message to be created and distributed.

It is an object of the present invention to provide a system and method for efficiently distributing multicast messages in computer networks having one or more VLAN regions.

It is a further object of the present invention to provide a system and method for efficiently distributing multicast messages sourced from outside a VLAN region into the VLAN region.

It is still a further object of the present invention to provide a system and method for efficiently distributing multicast messages to VLAN regions that scales well as the number of VLAN designations increases.

SUMMARY OF THE INVENTION

Briefly, the invention is directed to a system and method for efficiently distributing multicast messages within a computer network that includes one or more regions having a plurality of virtual local area network (VLAN) domains. According to the invention, a multicast network device (MND) having a plurality of interfaces includes a multicast controller for distributing multicast messages among the subscribing VLAN domains defined within the respective regions. The multicast controller, which is in communicating relationship with the interfaces, includes a VLAN assignment engine that is configured to assign responsibility for the VLAN domains within a given region to the extent there are multiple MNDs coupled to that region. That is, each MND coupled to the same VLAN region will be responsible for a different set of the respective VLAN domains. The multicast controller also accesses a multicast tag source to create a plurality of novel VLAN tags for efficiently distributing multicast messages.

According to a preferred embodiment of the invention, the multicast controller first creates a sub-regional multicast VLAN identifier (sub-regional MVLAN-ID). The sub-regional MVLAN-ID incorporates all of the VLAN designations for which the respective MND is responsible. The MND utilizes the sub-regional MVLAN-ID to forward multicast messages sourced from an entity outside the VLAN region or from an entity associated with a VLAN domain for which the respective MND is not responsible. The MNDs coupled to the same VLAN region also establish an inter-router virtual LAN (IRL) designation for use in communicating among themselves. In particular, the MNDs may use the IRL VLAN designation to forward external or internal multicast messages to the other MNDs so that they, in turn, may distribute the multicast messages with their respective sub-regional MVLAN-IDs. For multicast messages sourced from an entity associated with a VLAN domain for which the MND is responsible, the multicast controller also creates one or more "color-limited" M-VLAN IDs. Each color-limited MVLAN-ID incorporates all of the VLAN domains for which the respective MND is responsible, except for the VLAN domain with which the sourcing entity is associated. The color-limited MVLAN-IDs may be dynamically created and released so as to limit the overall number of VLAN designations that must be maintained by the MNDs and by the intermediate network devices located within the respective VLAN region.

In another aspect of the present invention, the MNDs generate and issue a series of novel multicast VLAN control messages for distributing their sub-regional MVLAN-IDs and their color-limited MVLAN-IDs. The multicast VLAN control messages may also be used to inform entities within the VLAN regions of multicast group information. Intermediate network devices within the VLAN regions are preferably configured to recognize these multicast VLAN control messages and to associate their respective ports with the sub-regional and color-limited MVLAN-IDs, in addition to performing other responsive functions.

BRIEF DESCRIPTION OF THE DRAWINGS

The invention description below refers to the accompanying drawings, of which:

FIGS. 4-7 are block diagrams of preferred multicast VLAN control messages in accordance with the present invention.

DETAILED DESCRIPTION OF AN ILLUSTRATIVE EMBODIMENT

Figure 1:
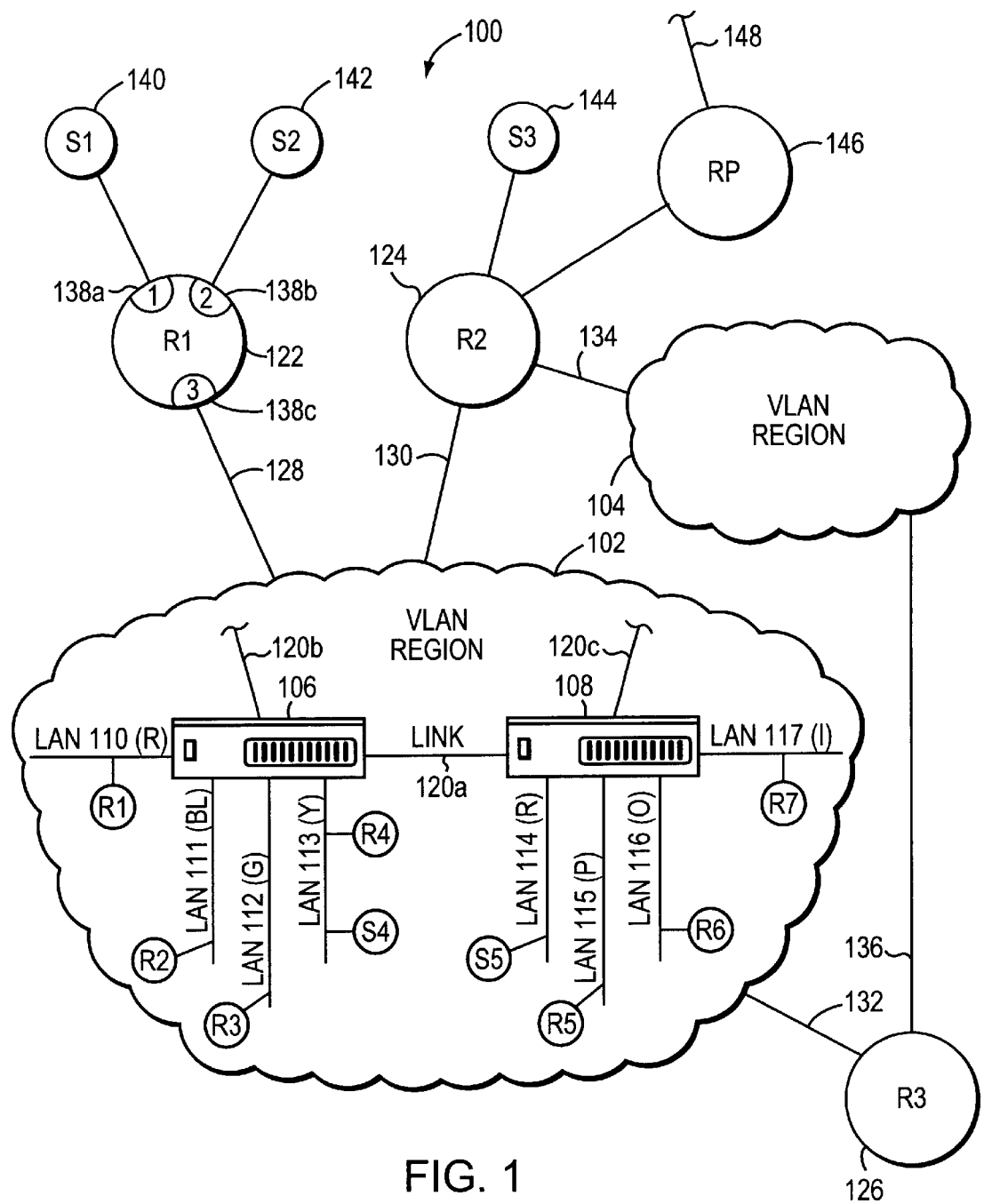
FIG. 1 is a highly schematic block diagram of a computer network.

FIG. 1 is a block diagram of an illustrative computer network 100. The network 100 includes a plurality of virtual local area network (VLAN) regions or clouds, such as VLAN regions 102 and 104, each of which includes a plurality of VLAN domains. More specifically, each VLAN region 102, 104 includes a plurality local area networks (LANs) to which end stations and/or servers may be coupled. These LANs and network entities, moreover, may be interconnected by one or more intermediate network devices, such as bridges and switches. VLAN region 102, for example, includes at least two switches 106, 108, which have a plurality of ports (not shown). Coupled to the ports of each switch 106, 108 are a plurality of LANs, such as LANs 110–113, and 114–117, respectively. Switches 106, 108 are also coupled together through trunk ports via link 120a. Each switch 106, 108 may include other trunk ports coupled to additional links 120b, 120c for interconnection with other intermediate network devices. Region 104 may similarly include a plurality of interconnected LANs, end stations and/or servers. Coupled to each region 102, 104 are a plurality of multicast network devices (MNDs) 122–126, which may also be identified as R1, R2 and R3, respectively. In particular, MNDs 122–126 are each coupled to VLAN regions 102 via separate trunks 128, 130 and 132, respectively. MNDs 124 and 126 are also coupled to VLAN region 104 via trunks 134 and 136, respectively.

Each MND 122–126 includes a plurality of ports that may be coupled by corresponding links to various devices or entities within the network 100. MND 122, for example, has 3 ports 138a–138c that are identified by port numbers 1–3, respectively. Port 138c (i.e., port number 3) is directly-connected to VLAN region 102 via link 128. One or more end stations and/or servers may also be directly-connected to or otherwise accessible by the MNDs 122–126. For example, end stations 140 and 142, which are identified as entities S1 and S2, respectively, are coupled to MND 122, while end station 144, which is identified as entity S3, is coupled to MND 124. Network 100 may also include one or more intermediate network devices, such as a router 146, that are configured as rendezvous points (RPs) in accordance with the Internet Engineering Task Force's Protocol Independent Multicast (PIM) protocol. The RP 146 may be coupled to one or more additional networks (not shown), including the Internet, via link 148.

Selected LANs, end stations and/or servers within each VLAN region 102, 104 may be logically grouped together to form one or more VLAN domains. Each VLAN domain is preferably associated with a corresponding numeric identifier or designation and, for convenience, may be further identified by a color code (e.g., red, blue, green, etc.). The IEEE 802.1Q standard, for example, allocates the numeric identifiers 1-4095 as possible VLAN designations, thereby supporting up to 4095 different VLAN designations. To associate any given LAN, end station, server, etc. with a VLAN domain, the bridge or switch coupled to that LAN, end station or server preferably associates the corresponding access port with the VLAN designation for that domain. Suppose VLAN region 102 is configured to include 8 VLAN domains, which may be referred to as "R" for red, "BL" for blue, "G" for green, "Y" for yellow, "O" for orange, "I" for indigo, "P" for purple, and "BR" for brown, and that VLAN region 104 is configured to include 5 VLAN domains, which may be referred to as "M" for magenta, "S" for silver, "W" for white, "V" for violet, and "T" for teal. Switch 106, moreover, may be configured to associate its access ports coupled to LANs 110–113 with the red, blue, green and yellow VLAN designations, respectively. Switch 108 may associate its access ports coupled to LANs 114–117 with the red, purple, orange and indigo VLAN designations, respectively. Switches 106 and 108 also associate their respective trunk ports that are coupled to links 120a–c with all of the VLAN designations or domains associated with the various end stations, servers, etc. that may be reached through the respective trunk port.

Figure 2:
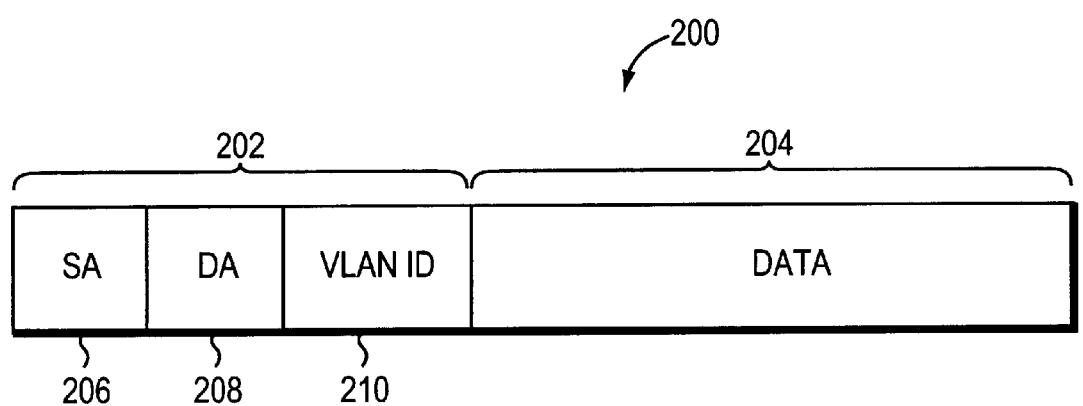
FIG. 2 is a block diagram of a VLAN-tagged message.

When a message received on an access port is to be forwarded onto a trunk port, switches 106, 108 preferably append a VLAN tag to the message. The VLAN tag contains the VLAN designation associated with the access port on which the message was received. The tagged message is then forwarded via the trunk port across the respective link 120a–c. FIG. 2 is a block diagram of a VLAN-tagged message 200. Message 200 includes a header 202, which may be compatible with the Media Access Control (MAC) sub-layer, and a data field 204. The message header 202 includes a destination address (DA) field 208 and a source address (SA) field 206, among others. Message header 202 further includes a Virtual Local Area Network Identifier (VLAN ID) field 210 following the SA and DA fields 206, 208. The VLAN ID field 210 is preferably loaded with the numeric identifier of the VLAN associated with the access port on which message 200 was received.

Upon receipt of tagged message 200, a receiving device examines the contents of the VLAN ID field 210 and the destination address in field 208. If the message 200 is destined for a LAN coupled to the receiving device, the VLAN ID field 210 is stripped off and the resulting un-tagged message is driven onto the respective access port. If the message 200 is to be forwarded onto another link, the receiving device preferably leaves the tagged message intact and drives it onto the respective trunk port. Trunk ports coupled to links 120a–c may be configured to operate in accordance with any number of VLAN encapsulation protocols, such as the IEEE 802.1Q Virtual Bridged Local Area Networks Protocol standard or the Interswitch Link (ISL) mechanism from Cisco Systems, Inc., as described in U.S. Pat. No. 5,742,604, which is hereby incorporated by reference in its entirety. Accordingly, bridges and switches within VLAN regions 102, 104 are capable of tagging, distributing and ultimately delivering such messages, provided that the VLAN designation of the message matches the VLAN designation associated with the destination entity.

It should be understood that network 100 is meant for illustrative purposes only and that the present invention will operate with other, possibly far more complex, network designs. Additionally, those skilled in the art recognize that other VLAN encapsulation or tagging protocols or schemes may be utilized. Furthermore, alternative arrangements for virtually associating a set of network entities with a selected VLAN domain also exist. For example, entities may be virtually associated based on their source addresses.

Intermediate devices such as layer 2 switches and bridges are generally unable to distribute messages across VLAN domains (e.g., from red to blue). The distribution of messages across VLAN domains is generally performed by layer 3 (or higher) intermediate network devices, such as a router or a layer 3 switch. Accordingly, messages, including multicast messages, that are being sent from one VLAN domain to another are typically forwarded to a layer 3 intermediate network device. As described below, MNDs 122–126 are preferably configured to efficiently distribute multicast messages among subscribing entities associated with different VLAN domains, as well as to subscribing entities that are located outside of the VLAN regions 102, 104.

Figure 3:
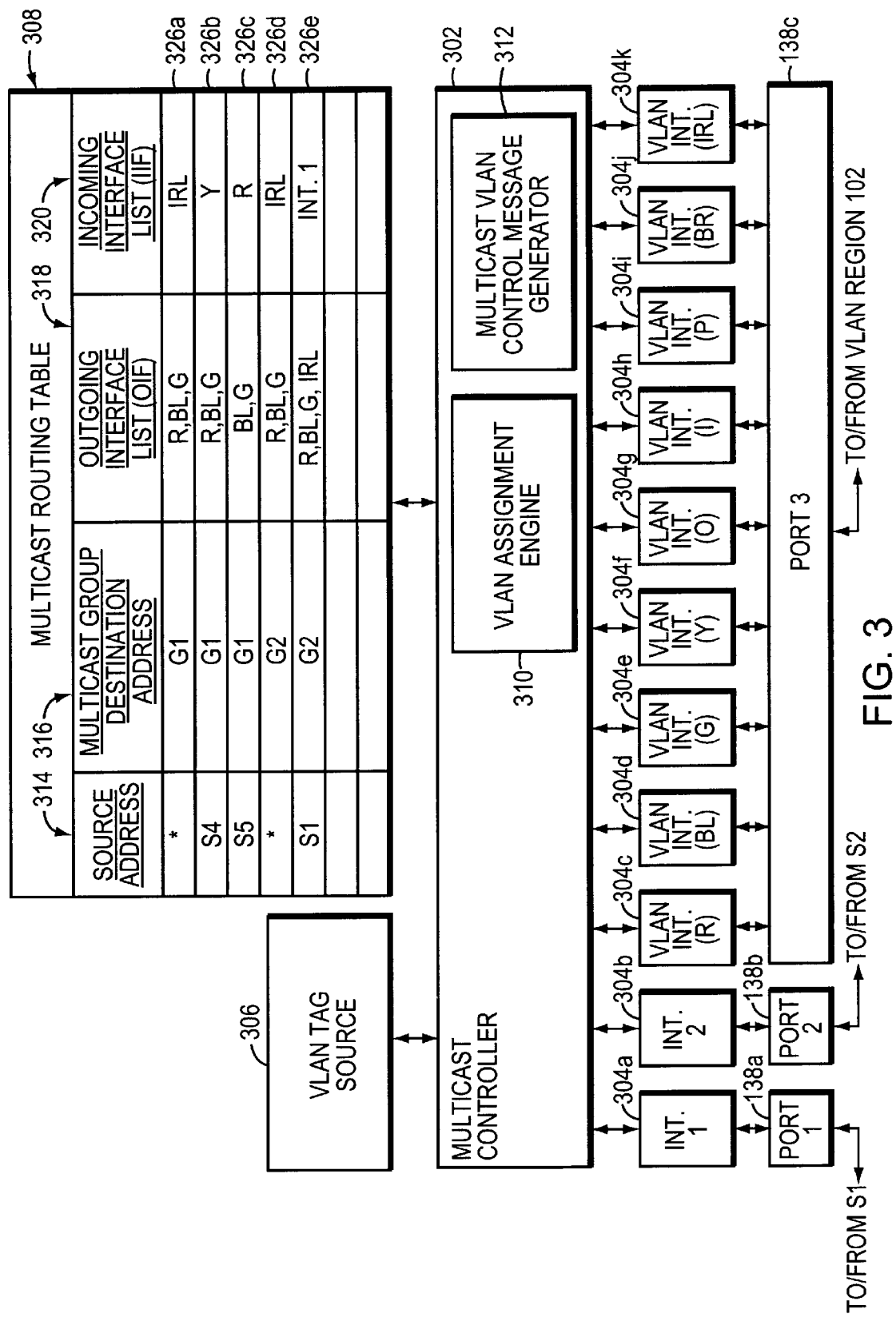
FIG. 3 is a partial, functional diagram of a multicast network device in accordance with the present invention.

FIG. 3 is a highly schematic, partial functional diagram of an MND, such as MND 122. MND 122 includes a multicast controller 302 that is in communicating relationship with a plurality of interfaces 304a–304k, which, in turn, are in communicating relationship with respective ports 138a–138c. The multicast controller 302 is also operatively coupled to a VLAN tag source 306 and to at least one multicast routing table 308. The multicast controller 302 also includes a plurality of sub-components, including a VLAN assignment engine 310 and a multicast VLAN control message generator 312. Interfaces 304c–304k, which are in communicating relationship with port 138c, are preferably associated with the VLAN designations defined within region 102 (FIG. 1) and thus reachable via port 138c. That is, for each VLAN domain defined within region 102 (i.e., red, blue, green, yellow, orange, indigo, purple, and brown), a corresponding VLAN interface 304c–304j is established at MND 122. In addition, a separate VLAN interface 304k is established by MND 122 for an inter-router VLAN designation (IRL), as explained in more detail below.

The multicast routing table 308 that is coupled to the controller 302 is preferably arranged into a plurality of rows and columns. More specifically, table 308 includes a first column 314 that corresponds to the source address of entities sourcing multicast messages, a second column 316 that corresponds to the multicast group address used by the respective multicast sourcing entities, a third column 318 that lists the outgoing interfaces used by multicast controller 302 to reach entities subscribing to the respective multicast group address, and a fourth column 320 that lists the incoming interfaces on which multicast controller 302 expects to receive multicast messages from the source identified in column 314. Additional columns (not shown) for containing information relating to timers, flag bits, etc. may also be included within table 308. Table 308 further includes a plurality of rows 326a–326e. Each row 326a–326e corresponds to a different {source address, multicast group address} pair.

Multicast controller 302 preferably comprises programmed or programmable processing elements containing software programs, such as software modules or libraries, pertaining to the methods described herein and executable by the processing elements. Other computer readable media may also be used to store and execute the program instructions. Controller 302 may also be implemented in hardware through a plurality of registers and combinational logic configured to produce sequential logic circuits and cooperating state machines. Those skilled in the art will recognize that various combinations of hardware and software components may also be utilized to implement the multicast controller of the present invention.

Suitable intermediate network device platforms for use as MNDs 122–126 include the 7500 series of routers, the Catalyst 8500® series of switch-routers and/or the Catalyst® 6000 family of multilayer switches all from Cisco Systems, Inc., as well as the device disclosed in commonly-owned U.S. Pat. No. 5,959,989, entitled, SYSTEM FOR EFFICIENT MULTICAST DISTRIBUTION IN A VIRTUAL LOCAL AREA NETWORK, that issued on Sep. 28, 1999, which is hereby incorporated by reference in its entirety. Suitable intermediate device platforms for use as switches and bridges within VLAN regions 102, 104 include the commercially available Catalyst 5000 series of switches from Cisco Systems, Inc., as well as the device disclosed in commonly-owned U.S. Pat. No. 6,553,028 entitled METHOD AND APPARATUS FOR MULTICAST SWITCHING USING A CENTRALIZED SWITCHING ENGINE, that issued on Apr. 22, 2003 and which is hereby incorporated by reference in its entirety.

Assignment of VLAN designations among MNDs

According to a preferred embodiment of the invention, each MND coupled to a given VLAN region is preferably responsible for distributing multicast messages (independent of multicast group address) to a disjoint set of the VLAN domains defined within that region. The assignment of VLAN domains to MNDs may be manually configured by a network administrator or automatically determined by the MNDs themselves. MNDs 122–126, for example, which are all coupled to VLAN region 102, may be manually configured such that MND 122 is responsible for the red, blue and green VLAN domains, MND 124 is responsible for the yellow, orange and indigo VLAN domains, and MND 126 is responsible for the purple and brown VLAN domains. In particular, the network administrator may configure each MND 124–128 either locally or remotely with the desired VLAN domain assignments using conventional commands structures, such as Command Line Interpreter (CLI) or Simple Network Management Protocol (SNMP). This information may be stored by the MNDs 122–126 in their non-volatile or dynamic memories in a conventional manner. Upon initialization, the multicast controller at each MND 122–126 accesses this configuration information and identifies the VLAN domains for which it is responsible.

Alternatively or in addition to manual configuration, the MNDs 122–126 may automatically assign VLAN domain responsibility among themselves, based on some selected criteria, such as IP address. That is, each MND 122–126 coupled to a VLAN region 102, 104 defines a separate VLAN interface for the respective VLAN domains, as described above. Assigned to each VLAN interface, moreover, is a separate IP address. For example, MND 122 includes VLAN interfaces 304c–304k. For each such interface 304c–304k, the network administrator will assign a different IP address. For example, VLAN interface 304c, which is associated with the red VLAN domain, will have a first IP address. The corresponding red VLAN interfaces at MNDs 124, 126 will similarly have their own second and third IP addresses, respectively. Interface 304d at MND 122, which is associated with the blue VLAN domain, will have a fourth IP address and so on.

Upon initialization, the VLAN assignment engines at each MND 122–126 may be configured to generate and transmit PIM Hello messages as defined by the Protocol Independent Multicast-Sparse Mode (PIM-SM) Protocol Specification, which is set forth at Request for Comments (RFC) 2362, and is hereby incorporated by reference in its entirety. In particular, the VLAN assignment engines preferably generate and transmit one or more PIM Hellos for each VLAN domain, which include the corresponding VLAN designation as a new option. For example, VLAN assignment engine 310 at MND 122 may generate a first hello message. In the header of the PIM Hello, engine 310 loads the first IP address, which was assigned to MND 122 for the red VLAN domain. The PIM Hello is then transported via link 128 into VLAN region 102.

The PIM Hello is received at MNDs 124 and 126 on their respective red VLAN interfaces. MNDs 124 and 126 compare the source IP address of the PIM Hello (corresponding to the first IP address at MND 122) with their own IP addresses associated with the red VLAN interface. The MND having the highest IP address is preferably assigned responsibility for the red VLAN domain. MNDs 122–126 similarly generate, transmit and examine PIM Hellos for the other VLAN domains of region 102 so as to assign responsibility for each VLAN domain to a single MND.

It should be understood that MNDs 124–128 may utilize other message schemes, such as PIM Asserts, to automatically assign VLAN domain responsibility among themselves.

Creation of Multicast VLAN-Identifiers

Sub-Regional MVLAN-IDs

Once the MNDs coupled to a given VLAN region have assigned responsibility for the various VLAN domains, each MND proceeds to establish its multicast VLAN identifiers (MVLAN-IDs). First, each MND establishes a single sub-regional multicast VLAN identifier (sub-regional MVLAN-ID) that encompasses all of the VLAN domains for which the respective MND is responsible. MND 122, for example, determines that it is responsible for the red, blue and green VLAN domains of VLAN region 102. In response, multicast controller 302 accesses the VLAN tag source 306 and selects an available VLAN designation (e.g., red-blue-green) for use as its sub-regional MVLAN-ID. The VLAN tag source 306 is preferably pre-configured by the network administrator with a block of numerical identifiers that are available for selection by the MND 122 as VLAN designations. The network administrator preferably ensures that there is no overlap among the VLAN designations provided to each MND coupled to the same VLAN regions. Alternatively, the MNDs may execute an extension to one or more protocols, such as the VLAN Trunk Protocol (VTP) from Cisco Systems, Inc., in order to obtain and release VLAN designations dynamically. The multicast VLAN control message generator 312 then generates and transmits one or more advertisement messages so that the intermediate network devices within VLAN region 102 can associate the new red-blue-green MVLAN-ID to their ports that are currently associated with the red, blue or green VLAN designations.

Figure 4:
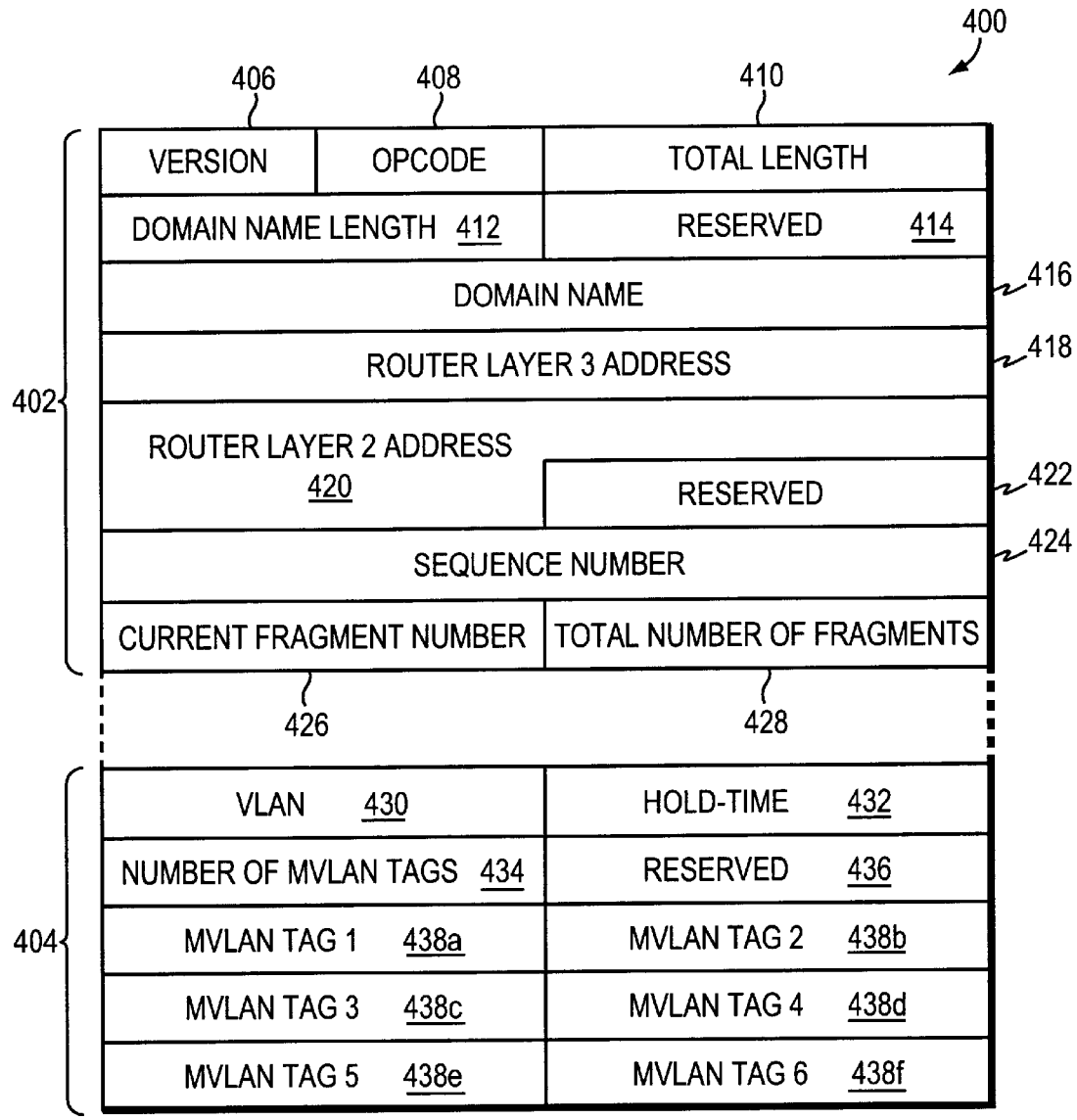

FIG. 4 is a block diagram of a preferred MVLAN advertisement message 400 that may be placed in the data portion 204 (FIG. 2) of a VLAN-tagged layer 2 message 200. MVLAN advertisement 400 includes a header portion 402 and a message portion 404 that is appended to the header 402. The header portion 402, moreover, includes a plurality of fields. In particular, the header 402 preferably includes a 1-byte version field 406 that identifies the version of the VLAN multicast protocol, and a 1-byte opcode field 408 that identifies the type of message. For example, for MVLAN-ID advertisement messages, opcode field 408 is preferably set to the hexadecimal value 0x30. Header 402 further includes a 2-byte total length field 410 that specifies the length of header portion 402 and message portion 404, a 2-byte domain length field 412, a 2-byte reserved or un-used field 414, and a 4-byte domain name field 416. The domain name field 416 preferably contains a name or handle that identifies the respective region (e.g., VLAN region 102) into which MVLAN advertisement 400 is being forwarded. The domain length field 412 specifies the number of valid bytes in field 416. Header 402 also includes a 4-byte router layer 3 address field 418 and a 6-byte router layer 2 address field 420 that preferably contains the network address and Media Access Control (MAC) address, respectively, of the MND sourcing advertisement 400. Header 402 further contains another reserved or un-used field 422, a sequence number field 424, which may be used to indicate whether the information being conveyed by the message portion 404 has been updated. To the extent message 400 is too long to fit within the data field 204 of message 200, and therefore must be broken-up and sent in a plurality of layer 2 messages 200, header 402 also includes a current fragment number field 426 and a total number of fragments field 428 to assist the receiving devices in re-assembling message 400.

The message portion 404 of MVLAN advertisement 400 also includes a plurality of fields. In particular, message portion 404 preferably includes a 2-byte VLAN designation field 430 that may be used for used for error checking purposes. More specifically, VLAN designation field 430 preferably contains the same VLAN designation that is loaded into field 210 of the corresponding tagged message 200. If upon receipt, the contents of the two fields are not the same, the message is preferably discarded. A hold-time field 432 preferably contains a time value for which the corresponding MVLAN-ID information contained in the message portion 404 is to be retained. Message portion 404 also includes one or more MVLAN tag fields, such as fields 438a–438f. Each MVLAN tag field 438a–438f contains a separate MVLAN designation that is to be associated with the VLAN designation of field 430.

It should be understood that header 402 may contain additional or different fields. For example, field 418 could be modified to hold 16-byte IP version 6 addresses.

As indicated above, after assigning responsibility for the various VLAN domains of region 102, the multicast VLAN control message generator 312 preferably generates one or more MVLAN advertisements 400. For each VLAN domain (e.g., red) for which MND 122 is responsible, message generator 312 builds an advertisement 400, loading that VLAN designation (e.g., red) into VLAN field 430 and the numeric identifier (e.g., 900) for the sub-regional MVLAN-ID (e.g., red-blue-green) into an MVLAN tag field, such a field 438a. Message generator 312 also loads the network address assigned to the respective VLAN interface (e.g., red) into the router layer 3 address field 418 and the corresponding layer 2 address into field 420. Message generator 312 then builds one or more tagged messages 200 (FIG. 2), loading the MVLAN advertisement 400 into the corresponding data field 204, and copying the VLAN designation from VLAN field 430 into the VLAN ID field 210. Message generator 312 addresses the message 200 to a preselected, layer 2 multicast address by loading this address in the destination address (DA) field 208. Message 200 containing advertisement 400 is then passed to the red VLAN interface 304c and driven onto trunk 128 for distribution into VLAN region 102.

Switches and bridges within region 102, including switches 106 and 108, are preferably configured to recognize the preselected, layer 2 multicast address in the DA field 208 of message 200 as corresponding to a multicast VLAN control message. In response, the bridge or switch (e.g., switch 106) examines the data portion 204 of the message 200, and due to the value contained in the opcode field 408, realizes that the message 200 is an MVLAN advertisement. As a result, the switch 106 then examines VLAN field 430 and MVLAN tag fields 438. To the extent switch 106 has any ports that are associated with the VLAN designation contained in VLAN field 430 (e.g., red), it also associates each of these ports with the MVLAN-IDs contained in each of the MVLAN tag fields 438 of advertisement 400. In this case, MVLAN tag field 438a contains the red-blue-green sub-regional MVLAN-ID as selected by multicast controller 302. Accordingly, switch 106 modifies its flow processing elements such that each port associated with the red VLAN designation is now associated with both the red VLAN designation and the red-blue-green sub-regional MVLAN-ID.

Switch 106 then forwards the message 200 containing advertisement 400 out all of its trunk ports that are associated with the red VLAN designation (other than the port on which the message was received). As a result, message 200 containing advertisement 400 is propagated throughout the red VLAN domain of region 102 and all switches or bridges within this domain that are configured to recognize the message 400 associate their red VLAN ports with the red-blue-green sub-regional MVLAN-ID.

The multicast VLAN message control generator 312 similarly proceeds to build and transmit an MVLAN advertisement 400 for each of the other VLAN domains for which MND 122 is responsible (i.e., blue and green) so as to associate these VLAN domains with the red-blue-green sub-regional MVLAN-ID as well. As a result, all of the switch and bridge ports within VLAN region 102 that were associated with the red, blue and/or green VLAN designations are now also associated with the red-blue-green sub-regional MVLAN-ID. In the preferred embodiment, multicast controller 302 sends the advertisements immediately upon selection of its sub-regional MVLAN-ID.

MNDs 124 and 126 similarly select a sub-regional MVLAN-ID for the VLAN domains for which they are responsible. They also generate and send corresponding MVLAN advertisements into VLAN region 102. Specifically, MND 124 may select the yellow-orange-indigo VLAN designation as its sub-regional MVLAN-ID, and MND 126 may select the purple-brown VLAN designation as its sub-regional MVLAN-ID.

It should be understood that, upon establishing one or more MVLAN-IDs, the corresponding MND may create a corresponding sub-interface that includes all of the VLAN interfaces encompassed by the respective MVLAN-ID.

Color-Limited MVLAN-IDs

Next, each MND 122-126 creates one or more color-limited MVLAN-IDs. The color-limited MVLAN-IDs encompass various subcombinations of the VLAN designations for which the respective MND is responsible. MND 122, for example, is responsible for the red, blue and green VLAN designations, and it has established the red-blue-green sub-regional MVLAN-ID to encompass all of them. MND 122 next selects three additional MVLAN-IDS, each corresponding to a different subcombination of the red, blue and green VLAN designations. Specifically, multicast controller 302 accesses and retrieves another available VLAN designation from the VLAN tag source 306 for use as a red-limited MVLAN-ID. The message generator 312 then formulates and transmits one or more advertisements 400 to VLAN region 102 in order to associate the red-limited MVLAN-ID with the blue and green VLAN domains. In particular, message generator 312 creates an advertisement message 400 loading the blue VLAN designation in VLAN field 430. In the MVLAN tag 1 field 438a, message generator 312 preferably loads the red-limited MVLAN-ID. In the MVLAN tag 2 field 438b, message generator 312 preferably loads the red-blue-green MVLAN-ID, since the red-blue-green MVLAN-ID is also associated with the blue VLAN designation. In other words, each advertisement message 400 preferably contains all of the MVLAN-IDs that are associated with the VLAN designation contained in VLAN field 430. This advertisement message 400 is then transmitted from the blue VLAN interface 304d and distributed among the bridges and switches within VLAN region 102. Upon receiving this advertisement message 400, bridges and switches within region 102 preferably associate the red-limited MVLAN-ID and the red-blue-green sub-regional MVLAN-ID with those ports that are currently associated with the blue VLAN designation.

Multicast controller 302 generates additional advertisement messages 400 to associate the green VLAN domain with the red-limited MVLAN-ID. In particular, message generator 312 builds additional advertisement messages 400 having the green VLAN designation in the VLAN field 430 and the red-limited MVLAN-ID and the red-blue-green sub-regional MVLAN-ID in MVLAN tag fields 438a, 438b. These advertisement messages 400 are also sent into VLAN region 102 so that the bridges and switches disposed therein may associate the red-limited and red-blue-green MVLAN IDs with their ports currently associated with the green VLAN designation. Multicast controller 302 then selects another available VLAN designation for use as a blue-limited MVLAN-ID and another for use as a green-limited MVLAN-ID. Corresponding advertisement messages 400 are similarly formulated by message generator 312 and distributed within region 102. As a result, those ports in VLAN region 102 originally associated with the red VLAN designation are now also associated with the red-blue-green sub-regional MVLAN-ID, the blue-limited MVLAN-ID, and the green-limited MVLAN-ID. Those ports originally associated with the blue VLAN designation are now also associated with the red-blue-green sub-regional MVLAN-ID, the red-limited MVLAN-ID, and the green-limited MVLAN-ID. Those ports originally associated with the green VLAN designation are now also associated with the red-blue-green sub-regional MYLAN-ID, the red-limited MVLAN-ID, and the blue-limited MVLAN-ID.

MNDs 124 and 126 similarly establish one or more color-limited MVLAN-IDs. In particular, MND 124, which is responsible for the yellow, orange, and indigo VLAN domains, selects a yellow-limited MVLAN-ID that it associates with the orange and indigo VLAN domains, an orange-limited MVLAN-ID that it associates with the yellow and indigo VLAN domains and an indigo-limited MVLAN-ID that it associates with the yellow and orange VLAN domains. Since MND 126 is only responsible for two VLAN domains, it may rely on those original VLAN designations rather than creating separate color-limited MVLAN-IDs.

MNDs 124 and 126 similarly assign responsibility for the various VLAN domains defined within VLAN region 104. MNDs 124 and 126 also define respective sub-regional MVLAN-IDs, color-limited MVLAN-IDs, and an inter-router LAN (IRL) designation for communication across region 104.

MNDs 122-126 periodically transmit MVLAN advertisements so that the information contained therein may be received by switches or bridges that are added to VLAN domains 102, 104 or by switches or bridges that recover from failures. If the information contained in a subsequent MVLAN advertisement is the same as that contained in the prior advertisement, the MND preferably leaves the sequence number contained in header field 424 un-changed. Accordingly, switches and bridges that receive subsequent MVLAN advertisements may first check the value in the sequence field 424. If that value is the same as the value from the last MVLAN advertisement that the switch or bridge received and processed, then it knows that the advertisement contains no new information and it may be ignored.

MNDs 122-124 preferably wait a selected period of time after issuing MVLAN-ID advertisements 400 before using the MVLAN-IDs so that the switches and bridges of regions 102, 104 may up-date their VLAN designation information.

Inter-Router VLAN (IRL)

In order to exchange messages among themselves through region 102, the MNDs 122-126 also select an inter-router VLAN (IRL) designation. Again, MNDs 122-126 may either be pre-configured by the network administrator with the identity of the IRL designation or they may elect a designation automatically. For example, the MNDs 122-126 may be configured to elect a default VLAN, such as the VLAN having the lowest numerical value, as the IRL. As described below, an MND uses the IRL designation to ensure that multicast messages are distributed to the VLAN domains for which the other MNDs are responsible.

It should be understood that MNDs 122-126 may establish multiple IRL VLAN designations. That is, for security reasons, MNDs 122 and 124 may use a first IRL VLAN designation for inter-communication, while MNDs 122-126 use a second IRL VLAN designation for inter-communication.

Creation of Multicast Groups

In order to transmit information (e.g., stock quotes, weather forecasts, etc.) to which multiple entities may be interested, a sourcing entity preferably obtains a multicast group address which it utilizes as the destination address for such messages (e.g., a multicast message stream). In the TCP/IP Reference Model, class D IP addresses are reserved for multicast messaging. To obtain an IP multicast address, a sourcing entity preferably contacts a Multicast Address Allocation Server pursuant to the Multicast Address Request Protocol (MARP) from the IETF. In response, the server provides an IP multicast group address (e.g., G1) to the sourcing entity. The allocated multicast group address is then advertised to the entities of network 100. To receive a selected multicast message stream, entities subscribe to such messages by registering with the MNDs 122-126. For example, pursuant to IGMP, an entity wishing to receive multicast messages corresponding to the G1 address issues a JoinGroup operation having G1 as one of its arguments to the MNDs 122–126. Switches and bridges that are IGMP-aware may listen in on such messages and perform filtering by propagating only a single subscription request up to the MNDs 122–126. Accordingly, MNDs 122–126 typically receive only one subscription request per interface. To cancel its membership, an entity issues a LeaveGroup operation also having G1 as an argument to the MNDs 122–126.

It should be understood that other protocols, such as the Generalized Attribute Registration Protocol (GARP) formerly the Group Address Registration Protocol from 3Com Corp. or the Cisco Group Management Protocol (CGMP) from Cisco Systems, Inc., may alternatively be used.

Building the Multicast Routine Tables

After selecting and advertising the existence of their sub-regional MVLAN-IDs and color-limited MVLAN-IDs, the MNDs 122–126 are ready to distribute multicast messages to and from the VLAN regions 102, 104. In response to an IGMP JoinGroup request for a particular multicast group address (e.g., G1), an MND creates a corresponding PIM shared-tree route entry in its multicast routing table. A shared-tree route entry is referred to as a {*, G} route entry where "*" is a wildcard value representing the source address and "G" is a variable representing the destination address. The MND also looks up the address for the RP associated with this multicast group address and enters the RP's address in a special field of the shared-tree route entry. In the outgoing interface list (OIF), the MND enters the interface at which the subscription request was received. In the incoming interface field (IIF), the MND adds the interface used to send unicast messages to the RP. The MND may also issue PIM Joins carrying the respective multicast group address to the RP.

For example, suppose MND 122 receives a JoinGroup request for multicast group address G1 from an entity (R1) located on LAN 110, which is associated with the red VLAN. The message is captured by the multicast controller 302, which looks up multicast address G1 and determines that RP 146 is the corresponding rendezvous point. Multicast controller 302 next creates a shared-tree route entry in table 308. In the corresponding cell for source address 314, multicast controller 302 enters a wildcard value (e.g., *). In the corresponding cell for destination address 316, multicast controller 302 enters the multicast group address of the JoinGroup request (e.g., G1). In the corresponding OIF cell 318, multicast controller 302 enters the interface on which the subscription request was received (e.g., red), and in the corresponding IIF cell 320, multicast controller 302 enters the interface utilized to send unicast messages to the RP 146 (e.g., IRL VLAN interface 304k). Suppose MND 122 next receives a second JoinGroup request for G1 from R2, which is associated with the blue VLAN designation. In response, the multicast controller 302 adds the blue VLAN interface (e.g., interface 304d) to the OIF cell of the {*, G1} shared-tree entry. Suppose, MND 124 similarly receives subscription requests from entities R3, R4, R5, R6 and R7, which are associated with the green, yellow, purple, orange, and indigo VLAN designations, respectively. In response, multicast controller 302 adds the green VLAN interface to the OIF for the {*, G1} shared-tree route entry. Since MND 122 is not responsible for the yellow, purple, orange or indigo VLAN domains, multicast controller 302 does not add these interfaces to the OIF for the corresponding shared-tree entry. That is, despite receiving JoinGroup requests on its yellow, purple, orange and indigo VLAN interfaces, multicast controller 302 does not add these interfaces to the OIF of the corresponding shared-tree route entry. Multicast controller 302 will thus have built route entry 326a as shown at table 308.

MNDs 124 and 126 will similarly receive the JoinGroup requests for multicast group address G1 from entities R1–R7. In response, the multicast controllers at MNDs 124 and 126 will create corresponding shared-tree route entries in their respective multicast routing tables. At MND 124, the corresponding OIF cell will include the orange, yellow and indigo VLAN interfaces. For MND 126, the corresponding OIF cell will only include the purple VLAN interface.

Distribution of Multicast Messages Sourced from Inside a VLAN Region

Suppose MND 122 receives a multicast message having the G1 multicast destination address from a sourcing entity S4 within region 102, which is associated with the yellow VLAN designation. Switches and bridges within VLAN region 102 will distribute such messages to any subscribers that are also associated with the yellow VLAN designation in a conventional manner. In particular, switches and bridges will either flood the multicast message throughout the yellow VLAN domain of region 102 if they are not IGMP-aware, or, if they are IGMP-aware, they will only forward the multicast message onto those ports that are both associated with the yellow VLAN designation and coupled to entities subscribing to G1 multicast messages. At MND 122, the message is received on its yellow VLAN interface 304f.

Multicast controller 302 at MND 122 will capture and examine the message and also search its multicast routing table 308 for the longest match to the source address and destination address pair of the message. Entry 326a, which corresponds to {*, G1}, represents the longest match. Rather than encapsulate the message in a PIM Register message and tunnel it to the RP 146, which is typically done by first-hop routers upon receiving a message matching a shared-tree route entry, multicast controller 302 preferably creates a source-specific route entry in the multicast routing table 308. More specifically, 10 multicast controller 302 creates a new entry in multicast routing table 308 having the address for entity S4 in the corresponding source address cell and the multicast group address G1 in the destination address cell. Multicast controller 302 also copies the interfaces listed in the OIF of the corresponding {*, G1} shared-tree route entry 326a into the OIF for this new source-specific route entry. In the corresponding IIF cell, multicast is controller 302 enters the interface used to send unicast messages to entity S4 (i.e., the yellow VLAN interface) as derived from the unicast routing tables (not shown) at MND 122. Multicast controller 302 will thus have built source-specific route entry 326b as shown in table 308.

To forward the multicast message from entity S4, multicast controller 302 first performs a Reverse Path Forwarding (RPF) check on the received message. In particular, multicast controller 302 checks to see whether the message was received on the interface used to send unicast messages to entity S4 (i.e., the yellow VLAN interface), which is also listed in the IIF for this {S4, G1} source-specific route entry. In this case, the multicast message from S4 was received at MND's yellow VLAN interface 304f and it thus passes the RPF check. Multicast controller 302 next determines whether the message can be considered to be an "internal" message or an "external" message. An internal message is one that was received on a VLAN interface for which the respective MND is responsible. All other messages are considered external. Here, the message was received on the yellow VLAN interface. Since MND 122 is not responsible for the yellow VLAN domain, multicast controller 302 concludes that the message is external.

To forward an external multicast message, the multicast controller 302 next determines whether or not the OIF list includes the IRL VLAN designation, which was selected for inter-router communication. If the OIF list does not contain the IRL VLAN designation, as here, the multicast controller 302 simply creates one copy of the message replacing its original VLAN designation in VLAN-ID field 210 (FIG. 2) with the sub-regional MVLAN-ID that it previously established. In this case, the multicast controller 302 at MND 122 replaces the yellow VLAN designation with its red-blue-green sub-regional MVLAN-ID. MND 122 also decrements the contents of a time-to-live (TTL) field of the message, modifies the source MAC address, and recalculates the checksum all in a conventional manner to reflect routing of the message. Multicast controller 302 then drives the message as tagged with the red-blue-green sub-regional MVLAN-ID onto any of the red, blue or green VLAN interfaces for forwarding to VLAN region 102.

As described above, switches and bridges within VLAN region 102 have previously associated the red-blue-green sub-regional MVLAN-ID with their red, blue and green ports. Accordingly, when the multicast message carrying the red-blue-green sub-regional MVLAN-ID is received at these switches and bridges, it may be forwarded onto any port associated with either the red, blue or green VLAN designations, since these ports are also associated with the red-blue-green MVLAN-ID. Thus, MND 122 is able to distribute the multicast message from entity S4, which is associated with the yellow VLAN designation, to subscribers associated with the red, blue and green VLAN designations, by means of a single copy of the multicast message tagged with its red-blue-green sub-regional MVLAN-ID.

The multicast message from entity S4 is also received at MND 124, which encapsulates the message in a PIM Register message and tunnels it to the RP 146, since MND 124 is responsible for the yellow VLAN. In addition, the multicast controller at MND 124 also preferably creates a source-specific route entry, copying the OIF list from the corresponding {*, G1} shared-tree route entry (i.e., the orange, yellow and indigo VLAN interfaces). Multicast controller next enters the interface used to send unicast messages to S4 (i.e., the yellow VLAN interface) in the IIF field for this new source-specific route entry. Upon detecting the presence of the yellow VLAN interface in both the OIF and IIF cells, the multicast controller deletes the yellow VLAN interface from the OIF cell since the same interface cannot appear in both the OIF and IIF cells of a single route entry. The multicast controller at MND 124 next performs an RPF check on the multicast message received from S4. Upon passing the RPF check, the multicast controller determines whether the message is an internal message or an external message. Since, MND 124 is responsible for the yellow VLAN domain, the multicast controller concludes that the message from S4, which is associated with the yellow VLAN domain, is an internal message. The multicast controller at MND 124 next determines whether the OIF cell of the just-created {S4, G1} source-specific route entry includes the IRL VLAN designation. If not, the multicast controller simply creates one copy of the message replacing the original VLAN designation in the VLAN-ID field 210 (FIG. 2) with the color-limited MVLAN-ID that it previously established for that VLAN designation. That is, the multicast controller at MND 124 replaces the yellow VLAN designation of the multicast message with its yellow-limited MVLAN-ID. MND 124 also decrements the TTL field, modifies the MAC source address and re-calculates the checksum.

The multicast controller then drives the message tagged with the yellow-limited MVLAN-ID onto either of its orange or indigo VLAN interfaces for delivery to VLAN region 102. As described above, switches and bridges within VLAN region 102 have previously associated the yellow-limited MVLAN-ID with their orange and indigo ports. Accordingly, when the multicast message carrying the yellow-limited MVLAN-ID is received at these switches and bridges, it may be forwarded onto any port associated with either the orange or indigo VLAN designations, since these ports are also associated with the yellow-limited MVLAN-ID. Thus, multicast message from S4 has now been distributed to all subscribers associated with the yellow, red, blue, green, orange and indigo VLAN designations.

The multicast message from entity S4 is also received at MND 126 on its yellow VLAN interface. The multicast controller at MND 126 similarly creates a source-specific route entry for the {S4, G1} pair at its multicast routing table. The multicast controller also applies a corresponding RPF check to the message and concludes, like MND 122, that the message is an external message. Accordingly, the multicast controller at MND 126 generates a single copy of the message replacing the yellow VLAN designation with its purple-brown sub-regional MVLAN-ID. This copy of the multicast message is then forwarded from MND 126 for delivery to the VLAN region 102. In a similar manner as described above, this copy of the multicast message is delivered by the switches and bridges of VLAN region 102 to the subscribing entities associated with the purple and brown VLAN designations. As shown, the multicast message from S4 has now been distributed to the subscribers associated with all of the VLAN domains.

It should be understood that a copy of the multicast message tagged with the red-blue-green sub-regional MVLAN-ID from MND 122 is also received at the red, blue and green VLAN interfaces of both MND 124 and MND 126. MNDs 124 and 126, however, expect to receive multicast messages sourced from S4 on their yellow VLAN interfaces. Accordingly, these copies of the multicast message fail the RPF checks at MNDs 124 and 126, and are discarded. Similarly, the copies of the multicast message tagged with the yellow-limited MVLAN-ID from MND 124 and the purple-brown sub-regional MVLAN-ID from MND 126 fail the RPF checks at the other MNDs and are also discarded.

Upon creating the {S4, G1} source-specific route entries at MNDs 122–126, each MND also issues one or more PIM Prune messages toward the RP 146. These PIM Prune messages direct the RP 146 and any intermediary routers to delete those interfaces leading to MNDs 122–126 from their OIF lists for the {*, G1} shared-tree route entries. This prevents MNDs 122–126 from receiving duplicate copies of multicast messages from S4 on the shared tree.

If another source within region 102 begins sourcing messages to multicast group address G1, the multicast controllers at MNDs 122–126 will create another source-specific route entry. For example, suppose an entity S5, which is associated with the red VLAN designation sources messages to multicast group address G1. Upon receipt of the first message at MND 122, multicast controller 302 will create a new source-specific route entry {S5, G1} at its multicast routing table. Multicast controller 302 will copy the interfaces from the OIF list of the {*, G1} shared-tree route entry and will enter the interface used to source unicast messages to entity S5 (e.g., the red VLAN interface) into the IIF cell. Multicast controller 302 will also delete the red VLAN interface from the OIF list since that interface also appears in the IIF cell, and the same interface cannot appear in both lists. The resulting OIF list will thus only contain the blue and green VLAN interfaces as shown in source-specific entry 326c of table 308. Multicast controller 302 will then perform an RPF check on the received message. Since the message was received on the red VLAN interface, multicast controller 302 will also conclude that it is an internal message. Accordingly, multicast controller 302 will replace the contents of the message's VLAN-ID field 210 (FIG. 2) with the red-limited MVLAN-ID that it previously created and advertised to VLAN region 102. The multicast controllers at MNDs 124 and 126 will also create corresponding source-specific route entries and, since the message from S5 is considered an external message by MNDs 124 and 126, they forward a single copy of the message tagged with their respective sub-regional MVLAN-IDs.

As shown, with the present invention, only a few copies of a multicast message need to be created in order to distribute it to subscribing entities associated with a large number of diverse VLAN designations. In particular, each MND only creates a single copy of the multicast message.

Distribution of Multicast Messages Sourced from Outside a VLAN Region

Suppose entities associated with the red, blue, green, orange, yellow, indigo and brown VLAN designations also issue IGMP JoinGroup requests for the multicast group address G2. In response, the multicast controllers at MNDs 122–126 will create a corresponding shared-tree route entry {*, G2} at their multicast routing tables, as described above. In the IIF field for these route entries, each multicast controller will enter the corresponding interface used to reach the RP assigned to this multicast group address (e.g., RP 146). Suppose further that entity 140 (i.e., S1), which is directly-connected to MND 122, sources a message to the G2 multicast group address. Upon receipt of the message at MND 122, multicast controller 302 will create a new source-specific entry {S1, G2} at its multicast routing table 308. Multicast controller 302 will copy the interfaces from the OIF list of the corresponding {*, G2} shared-tree route entry (i.e., the red, blue and green VLAN interfaces) and enter them in the OIF for this source-specific entry. The multicast controller 302 will also obtain the interface used to source unicast messages to entity S1 (i.e., interface 304a) and enter this interface into the corresponding IIF space.

Multicast controller 302 next performs an RPF check on the message from S1. Since the message was received on interface 304a, which is the interface listed in the IIF, it passes the RPF check. Next, multicast controller 302 determines whether the message is internal or external. As it was not received on any directly-connected VLAN interface for which MND 122 is responsible, multicast controller 302 concludes that the message is external. At this point, the OIF list only contains the red, blue and green VLAN interfaces. Accordingly, multicast controller 302 creates a single copy of the multicast message from entity S1, appends a VLAN-ID field 210 (FIG. 2) to the message and loads it with the red-blue-green sub-regional MVLAN-ID. MND 122 also decrements the TTL field, modifies the MAC source address and re-calculates the checksum. Controller 302 then drives the tagged message onto its red, blue or green VLAN interface for delivery to VLAN region 102. As described above, switches and bridges within VLAN region 102 distribute this message to all subscribing entities associated with the red, blue or green VLAN designations.

In addition, a copy of the message is received at MNDs 124 and 126 on each of their red, blue and green VLAN interfaces. MNDs 124 and 126 note that the multicast message was sourced from S1, which is not directly-connected to either MND 124 or 126. MNDs 124 and 126, moreover, cannot create a source-specific route entry in their multicast tables for S1 solely in response to receiving a multicast message from S1. Thus, MNDs 124 and 126 are left with their {*, G2} shared-tree route entries, and they expect to receive multicast messages matching the {*, G2} shared-tree entry on their interfaces used to send unicast messages to the RP 146. Here, the multicast messages were received on the red, blue and green VLAN interfaces of MNDs 124 and 126. Accordingly, each message fails the RPF checks at MNDs 124 and 126 and is discarded.

In order to create a {S1, G2} source-specific route entry, MNDs 124 and 126 must first issue PIM Joins to MND 122. That is, MNDs 124 and 126 "know" that MND 122 is one of their PIM neighbors and that MND 122 is responsible for the red, blue and green VLAN domains of region 102, which correspond to the interfaces on which the multicast message from S1 were received. Accordingly, MNDs 124 and 126 each send PIM Join messages to MND 122 so that they may be added to its OIF list for the {S1, G2} source-specific route entry. In response to the PIM Joins, multicast controller 302 adds the interface(s) used to reach MNDs 124 and 126 to the OIF list for the {S1, G2} source-specific route entry. As described above, MNDs directed-connected to the same VLAN region utilize the predetermined IRL VLAN designation for communicating among themselves. Accordingly, multicast controller 302 adds the IRL VLAN designation to the OIF list for is the {S1, G2} source-specific route entry, since this is the interface used to reach both MND 124 and MND 126, as indicated by route entry 326e of table 308.

Having issued the PIM Joins, MNDs 124 and 126 may now create respective {S1, G2} source-specific route entries in their multicast routing tables. In particular, MNDs 124 and 126 copy the set of interfaces from the OIF list for the corresponding {*, G2} entry into the OIF list for their {S1, G2} source-specific route entry. MNDs 124 and 126 enter the IRL VLAN interface in the IIF field for this source-specific route entry since this is the interface used to send unicast messages (via MND 122) to S1.

Upon receiving the next multicast message from S1, multicast controller 302 identifies the {S1, G2} source-specific route entry 326e as providing the longest match. The message also passes the RPF checks, since it was received on interface 304a. However, the OIF list for this route entry 326e now contains the IRL VLAN interface as well as the red, blue and green VLAN interfaces. Controller 302 also concludes, that the message is an external message since it was not received on a VLAN interface for which MND 122 is responsible. Accordingly, multicast controller 302 preferably generates two tagged copies of the message. In particular, the controller 302 first generates a copy of the message which it tags with the red-blue-green sub-regional MVLAN-ID, as described above. Controller 302 also creates a second copy which it tags with the IRL VLAN designation. The two tagged messages are then forwarded from the respective interfaces at MND 122 and delivered,o VLAN region 102.

Again, the message tagged with the red-blue-green MVLAN-ID is received at the red, blue and green VLAN interfaces at MNDs 124 and 126, and they identify the {S1, G2} route entries as providing the longest match. However, these messages fail the RPF checks and are discarded. MNDs 124 and 126 also receive copies of the message on their IRL VLAN interfaces. Again, MNDs 124 and 126 identify their {S1, G2} route entries as providing the longest match. This time, however, the messages pass the RPF checks. That is, the messages are received on the device's IRL VLAN interfaces, which are the interfaces used to source unicast messages to S1. Accordingly, MNDs 124 and 126 proceed to examine the interfaces listed in the corresponding OIF cells. At MND 124, the OIF cell lists the yellow, orange and indigo VLAN interfaces. MND 124 also concludes that the message was not received on a VLAN interface for which it is responsible, and thus MND 124 treats the message as external. MND 124 also notes that the OIF list does not include the IRL interface. Accordingly, MND 124 generates a single copy of the message which it tags with the yellow-orange-indigo sub-regional MVLAN-ID. MND 126 proceeds in a similar fashion to generate a single copy of the message tagged with its purple-brown sub-regional MVLAN-ID. These messages are delivered to VLAN region 102 and are distributed by the switches and bridges to the subscribing entities associated with the yellow, orange, indigo and purple VLAN associations. Accordingly, all subscribers within region 102 receive the G2 multicast traffic sourced from S1. As shown, the number of MVLAN-IDs that are preferably created to distribute multicast messages remains manageable even as the number of VLAN designations increases. More specifically, an MND that is responsible for "n" VLAN domains only needs to establish or maintain at most (n+2) MN LAN-IDs (i.e., 1 sub-regional MVLAN-ID, n color-limited MVLAN-IDs and 1 IRL VLAN designation). This is achieved, in part, by establishing and using MVLAN-IDs that may encompass VLAN domains in which there are no subscribers to a particular multicast group address.

It should be understood that MNDs 122–126 may also combine the IRL VLAN designation with their MVLAN-IDs. That is, to avoid replication of a message on both the sub-regional MVLAN-ID and the IRL VLAN designation, as described above, each MND 122–126 may establish an IRL sub-regional MVLAN-ID that encompasses all of the VLAN designations from th e sub-regional MVLAN-ID together with the IRL VLAN designation. If the MND determines that a particular multicast message should be forwarded on both its sub-regional MVLAN-ID and the IRL VLAN, it preferably utilizes the new IRL sub-regional MVLAN-ID and forwards only a single tagged copy of the message. MNDs 122–126 may similarly establish one or more IRL color-limited MVLAN-IDs. Thereafter, if a particular multicast message is to be distributed on both a color-limited MVLAN-ID and the IRL VLAN, the respective MND may simply create a single copy of the message tagged with the corresponding IRL color-limited MVLAN-ID.

Multicast Message Filters

Oftentimes it is desirable to block certain multicast traffic from reaching one or more VLAN domains. That is, a network administrator may decide that entities associated with one or more VLAN designations (e.g., green and indigo) should be blocked from receiving traffic addressed to one or more multicast group addresses (e.g., G1 and G3) for security or other reasons. As described above, the decision to forward a multicast message tagged with a sub-regional or color-limited MVLAN-ID depends on whether the particular message is considered to be an internal or an external message by the respective MND. It is not dependent on the VLAN interfaces which actually subscribe to the subject multicast group address. For example, suppose only entities associated with the red, blue, yellow and orange VLAN designations issue JoinGroup requests for the G1 multicast group address. The corresponding OIF lists at MNDs 122 and 124 will include the red and blue VLAN interfaces and the yellow and orange VLAN interfaces, respectively. Nonetheless, if a source associated with the yellow VLAN designation sources a multicast message to G1, multicast controller 302 at MND 122 will tag a copy of the message with its red-blue-green sub-regional MVLAN-ID, even though there are no subscribers associated with the green VLAN designation. Similarly, the multicast controller at MND 124 will tag a copy of the message with its yellow-limited MVLAN-ID, even though there are no subscribers associated with the indigo VLAN designation. As a result, entities associated with the green and indigo VLAN designations may inadvertently receive copies of these multicast messages.

In a further embodiment, the present invention includes a mechanism for maintaining network filtering decisions, while allowing the use of sub-regional and color-limited MVLAN-IDs. More specifically, MNDs 122–126 preferably issue one or more filter messages to the switches and bridges of VLAN regions 102, 104. The filter messages are used to configure one or more access control lists at the switches and bridges so that they may block the transmission of specific multicast group addresses to identified VLAN domains. Thus, even though multicast messages may be tagged with MVLAN-IDs, the switches and bridges prevent them from being forwarded onto certain access ports.

FIG. 5 is a block diagram of a preferred filter message 500. Message 500 is preferably appended to a header having the format of header 402 (FIG. 4) described above. The opcode field 408 used for filter message 500 is preferably set to a preselected value (e.g., the hexadecimal 0x33) to indicate that the corresponding message is a filter message. Filter message 500 preferably includes a plurality of pre-defined fields. In particular, filter message 500 has a VLAN field 502, that carries the VLAN designation to which the message 500 pertains. Message 500 further includes a field 504, which carries the number of multicast group addresses that are included within the message 500, and a series of multicast group address fields 506a–506n, which contain those multicast group addresses.

It should be understood that the multicast group addresses may be either network layer addresses (e.g., IP class D multicast addresses) or Media Access Control (MAC) sub-layer multicast addresses.

Upon initialization, MND 122 accesses its configuration files (not shown), which may include one or more access control lists or filters for blocking specific multicast traffic to one or more VLAN domains. If the blocked VLAN domains include one or more domains for which MND 122 is responsible, multicast controller 302 directs the message generator 312 to formulate and transmit one or more corresponding filter messages. As mentioned above, the configuration files may direct MND 122 to block G1 and G3 multicast traffic from entering the green and indigo VLAN domains. Since MND 122 is responsible for the green VLAN domain, multicast controller 302 directs the message generator 312 to formulate a filter message 500 having the green VLAN designation in VLAN field 502. Since there are two multicast group addresses to be blocked, field 504 is preferably set to "2". The message generator 312 then enters multicast group address G1 in first multicast group address field 506a, and multicast group address G3 in second address field 506b. Filter message 500 is then preferably tagged with the VLAN designation corresponding to VLAN field 502 (i.e., green) and forwarded for delivery to the bridges and switches of VLAN region 102.

Filter message 500 is received and processed by the switches and bridges of region 102. At switch 106, for example, message 500 is captured, and due to its destination address and the contents of its opcode field 408, it is recognized as a multicast control filter message. Switch 106 reviews the VLAN designation contained in VLAN field 502 and the addresses listed in fields 506. Switch 106 will then create an access control filter that blocks G1 and G3 multicast messages from being delivered onto access ports that are associated with the green VLAN designation. MND 124 similarly creates one or more filter messages containing the indigo VLAN designation in VLAN field 502 and G1 and G3 in the multicast group address fields 506. When this filter message is subsequently received at switch 106, it up-dates its access control filter to block G1 and G3 multicast messages from being delivered onto access ports that are associated with the indigo VLAN designation.

Releasing Un-Used Multicast VLAN Identifiers

As described above, upon establishing the sub-regional and color-limited MVLAN-IDs, MNDs 122–126 issue advertisement messages 400 to the intermediate devices located in VLAN regions 102, 104 so that they, in turn, may associate their respective ports with these new "VLAN" designations. Although there will only be one sub-regional MVLAN-ID for each MND directly-connected to any given VLAN region, the number of color-limited MVLAN-IDs may be substantial, especially where the VLAN region includes a large number VLAN designations. As a result, one or more intermediate devices within a VLAN region may lack sufficient memory to store all of the MVLAN-IDs being established. According to a further embodiment of the present invention, MNDs 122–126 are also configured to release un-used color-limited MVLAN-IDs so as to free up memory at the intermediate devices.

In particular, for each MVLAN-ID, switches and bridges, such as switch 106 (FIG. 1), may generate a corresponding {MVLAN-ID, Multicast Group Address} pair for every multicast group address for which switch 106 is aware. For example, suppose switch 106 is aware of 11 multicast group addresses. For every MVLAN-ID, switch 106 will create 11 corresponding {MVLAN-ID, Multicast Group Address} pairs. These {MVLAN-ID, Multicast Group Address} pairs, moreover, may either be loaded directly into the forwarding table at switch 106 or used as indexes for purposes of hashing into the forwarding table. If switch 106 is unable to create any (MVLAN-ID, Multicast Group Address} pair in response to an MVLAN-ID advertisement 400 (FIG. 4), it preferably issues a negative acknowledgment (e.g., a NACK) message to the MND that advertised the respective MVLAN-ID.

For example, suppose switch 106 receives an advertisement message tagged with the red VLAN from MND 122 advertising the existence of the red-blue-green sub-regional MVLAN-ID, the blue-limited MVLAN-ID, and the green-limited MVLAN-ID. If switch 106 is aware of 11 multicast group addresses (e.g., G1–G11), it will try and create 33 corresponding {MVLAN-ID, Multicast Group Address} pairs. If switch 106 is unable to create any pair, such as {blue-limited MVLAN-ID, G7}, it preferably generates and transmits a NACK message to MND 122.

Figure 6:
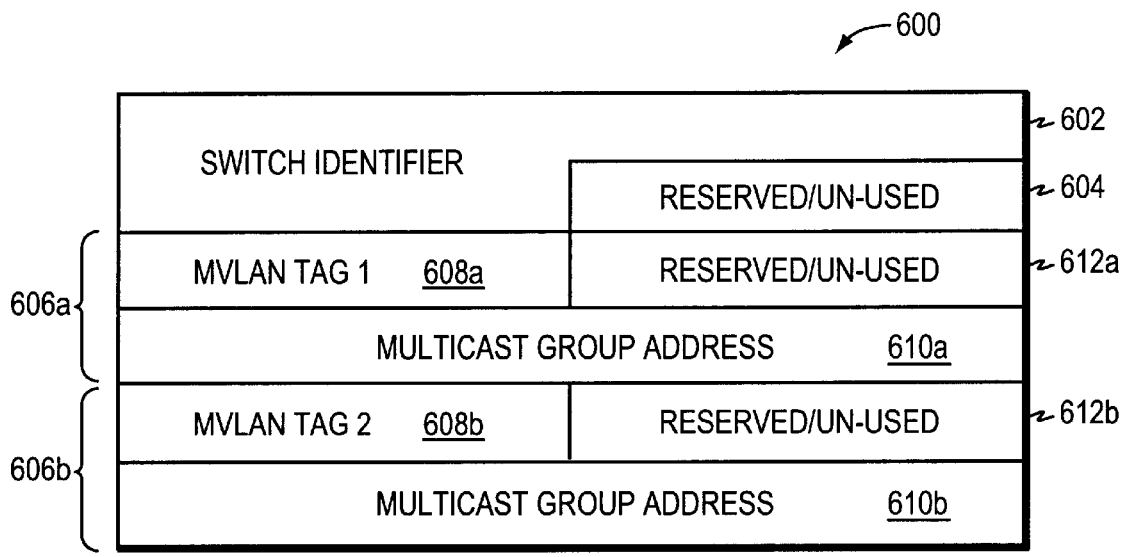

FIG. 6 is a block diagram of a preferred NACK message 600. Appended to message 600 is a header that preferably conforms to header 402 (FIG. 4). Switch 106 preferably loads the opcode field 408 of the NACK message 600 with a preselected value (e.g., the hexadecimal 0x33) to indicate that this is a NACK message. NACK message 600 preferably includes a plurality of fields including a switch identifier field 602 that contains the MAC address of the switch sourcing the NACK, and a first reserved or un-used field 604. For each MVLAN-ID which is being negatively acknowledged, the NACK message 600 preferably includes a set of fields for carrying the MVLAN-ID and the corresponding multicast group address. NACK 600, for example, includes two sets of fields 606a, 606b. Each set 606a, 606b, moreover, includes an MVLAN tag field 608a, 608b, and a corresponding multicast group address field 610a, 610b. The sets 606a, 606b may also include one or more reserved or un-used fields, such as fields 612a, 612b, for formatting purposes.

Switch 106 preferably formulates NACK message 600 and enters the MVLAN-ID that is being negatively acknowledged (i.e., the blue-limited MVLAN-ID) into an MVLAN tag field, such as field 608a. In the corresponding multicast group address field 610a, switch 106 enters the address (i.e., G7) being negatively acknowledged together with the MVLAN-ID. Switch 106 also formulates a message header 402 as described above and appends it to the NACK message 600. The NACK message 600 is then tagged with VLAN designation associated with the advertisement message 400 being negatively acknowledged (e.g., red), and transmitted to MND 122, which sourced the advertisement message 400 containing the blue-limited MVLAN-ID. Preferably, switch 106 sends several copies of NACK messages 600 to increase the probability that it is received.

At MND 122, the NACK message 600 is captured by or otherwise forwarded to the multicast controller 302, which proceeds to alleviate the memory shortage problem at switch 106. Multicast controller 302 may apply several techniques to free up memory at switch 106. For example, multicast controller 302 may determine whether any of the color-limited MVLAN-IDs that it has established have yet to be used with the multicast group address negatively acknowledged by switch 106. If there are such as yet un-used color-limited MVLAN-IDs, controller 302 preferably releases one or more of them. More specifically, multicast controller 302 preferably directs message generator 312 to generate and transmit one or more group address advertisement messages, limiting the number of multicast group addresses associated with the MVLAN-IDs that it has established.

Figure 7:
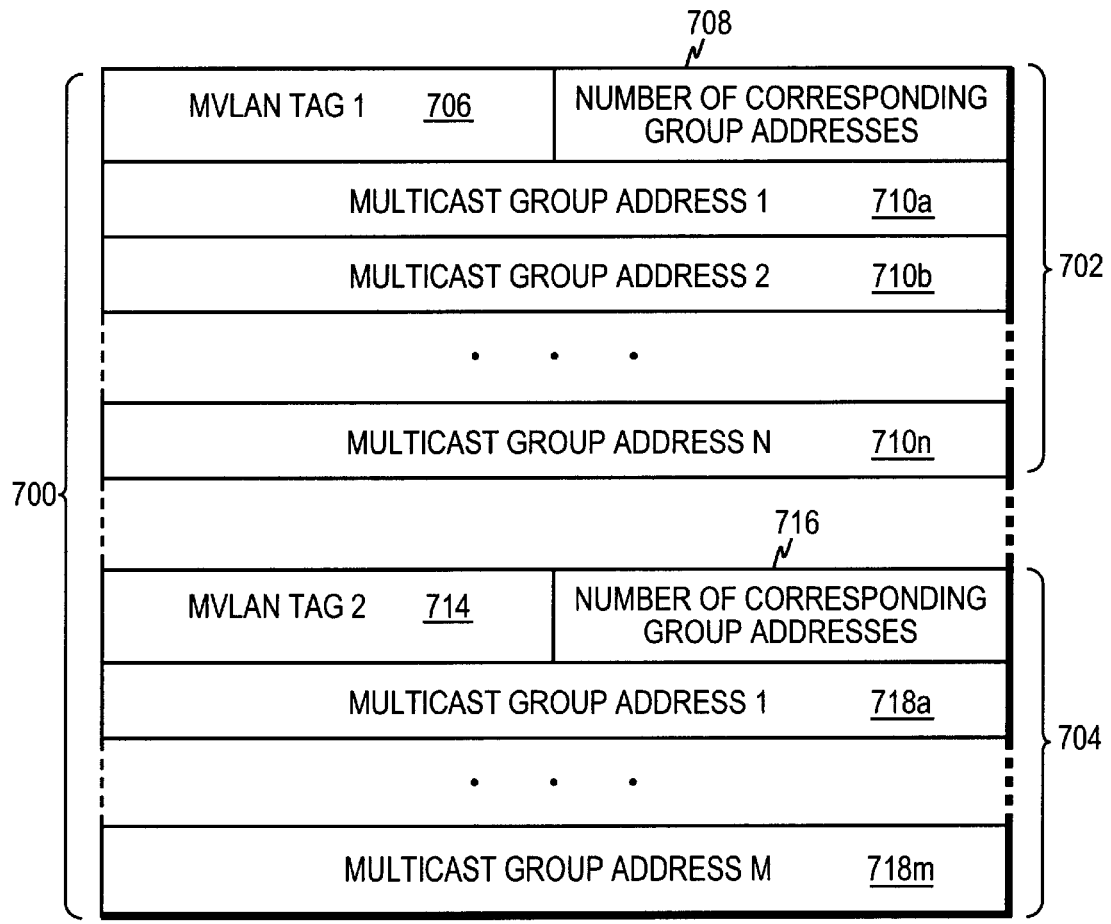

FIG. 7 is a block diagram of a preferred group advertisement message 700, which is preferably appended to a header similar in format to header 402 (FIG. 4). Message generator 312 preferably loads the opcode field 408 of the group advertisement 700 with a preselected value (e.g., the hexadecimal 0x32) to indicate that this is a group advertisement message. Group advertisements are preferably arranged into one or more message areas each containing an MVLAN-ID and the multicast group addresses associated with that MVLAN-ID. Group advertisement 700, for example, has two message areas 702, 704 each comprising a plurality of fields. More specifically, area 702 has an MVLAN tag field 706 that contains the MVLAN-ID associated with this area 702, an address number field 708 that contains the number (e.g., N) of multicast group addresses that are associated with the MVLAN-ID of field 706, and a series of address fields 710a–710n, each containing one of the corresponding multicast group addresses. Area 704 of group advertisement 700 similarly includes an MVLAN-ID field 714, a field 716 for the number (e.g., M) of addresses associated with this MVLAN-ID, and a series of multicast group address fields 718a–718m that contain those multicast group addresses. For clarity, only a partial number of the multicast group address fields of areas 702, 704 are shown.

Multicast controller 302 issues group advertisement message 700 in response to receiving a NACK message 700 in order to limit the number of {MVLAN-ID, multicast group address} pairs that must be established at the switches and bridges of VLAN region 102. For example, suppose a particular MVLAN-ID (e.g., the blue-limited MVLAN-ID) established at MND 122 has yet to be used with one or more multicast group addresses (e.g., G5 and G9). In response to this condition, multicast controller 302 preferably directs message generator 312 to omit these two multicast group addresses from the series of multicast group addresses associated with this MVLAN-ID in a corresponding group advertisement message 700. That is, message generator 312 enters the blue-limited MVLAN-ID at field 706, the multicast group addresses G1–G4, G6–G8 and G10–G11 at fields 710, and the value "9" which represents the number of multicast group addresses associated with the blue-limited MVLAN-ID at field 708. Controller 302 directs message generator 312 to enter similar information for the other MVLAN-IDs into the other areas of group advertisement 700. Message generator 312 then tags group advertisement 700 with the default VLAN designation (i.e., VLAN 1) and transmits it to the switches and bridges of VLAN region 102. Pursuant to the IEEE 802.1Q standard, all switch and bridge ports are associated (at least initially) with the default VLAN. The group advertisement 700 is also addressed to a MAC destination address that the switches and bridges are configured to recognize.

Group advertisement 700 is then propagated throughout the VLAN region 102 and received at the switches and bridges disposed therein. In particular, switch 106 will receive message 700 and recognize it as a group advertisement, because of its destination address and the value in its opcode field 408. In response to the contents of the group advertisement 700, switch 106 will delete any {MVLAN-ID, Multicast Group Address} pairs or entries that are not specified in the advertisement 700. In particular, since multicast group addresses G5 and G9 are not included in the list of addresses associated with the blue-limited MVLAN-ID, switch 106 deletes both its {blue-limited MVLAN-ID, G5} and {blue-limited MVLAN-ID, G9} entries, thereby freeing memory space. Through group advertisement messages, the MNDs 122–126 may release un-used MVLAN-IDs allowing switches and bridges to create forwarding entries only for those multicast group addresses that are currently active.

If MND 122 subsequently receives a G5 or G9 multicast message that should be forwarded on the blue-limited MVLAN-ID, it may add the address to subsequent group advertisements issued to the bridges and switches of VLAN region 102. That is, message generator 312 will formulate a group advertisement message and in the list of multicast group addresses for the blue-limited MVLAN-ID, it will insert the G5 or G9 address. In response, switches and bridges in region 102 will create corresponding {blue-limited MVLAN-ID, G5} or {blue-limited MVLAN-ID, G9} entries at their forwarding tables. As shown, the processing of group advertisements by switches and bridges does not result in any change to the VLAN designations associated with switch or bridge ports. Instead, group advertisements only affect the forwarding table or index entries that are created by the switches or bridges.

It should be understood that, to the extent MVLAN-IDs are released, multicast controller 302 preferably returns them to the VLAN tag source 306 so that they may be re-used. It should be further understood that other techniques or mechanisms may be used to release un-used MVLAN-IDs.

The foregoing description has been directed to specific embodiments of this invention. It will be apparent, however, that other variations and modifications may be made to the described embodiments, with the attainment of some or all of their advantages. For example, multicast VLAN control messages may take other formats including fewer or greater numbers of fields. In addition, the color-limited MVLAN-IDs may alternatively be created only in response to receiving a multicast that is to be forwarded on the color-limited MVLAN-ID. Therefore, it is the object of the appended claims to cover all such variations and modifications as come within the true spirit and scope of the invention.

What is claimed is:

1. A multicast network device (MND) having a plurality of interfaces for forwarding messages within a computer network, the computer network having at least one region that includes a plurality of virtual local area network (VLAN) domains and to which the MND is directly-coupled, the MND comprising:

a multicast controller for efficiently distributing multicast messages to subscribing entities associated with one or more of the VLAN domains, wherein the multicast controller is configured to:

establish a sub-regional Multicast VLAN Identifier (MVLAN-ID) that encompasses a set of the VLAN domains, and one or more color-limited MVLAN-IDs that encompass all but one of the VLAN domains within the set, append the sub-regional MVLAN-ID to multicast messages received either from outside of the VLAN region or from a VLAN domain not included with the set of VLAN domains, append a selected color-limited MVLAN-ID to multicast messages that are received from within the VLAN region, and are associated with a VLAN domain included within the set of VLAN domains, and establish an inter-router VLAN (IRL) designation for use in communicating with one or more neighboring MNDs.

2. The MND of claim 1 further comprising a VLAN assignment engine that is configured to select zero, one or more VLAN domains for inclusion within the set of VLAN domains.

3. The MND of claim 2 further comprising a multicast VLAN control message generator that is configured to generate and transmit one or more advertisement messages for associating the sub-regional MVLAN-ID with the set of VLAN domains, and for associating the color-limited MVLAN-IDs with the respective VLAN domains.

4. The MND of claim 3 further comprising a plurality of interfaces a number of which may be associated with the VLAN domains of the directly-connected region, wherein the multicast controller is further configured to:

perform a reverse path forwarding (RPF) check on a received multicast message based upon the interface on which the multicast message was received; and provided that the multicast message was received on an interface associated with a VLAN domain, determine whether the interface is associated with a VLAN domain included within the set so as to determine whether to append the sub-regional MVLAN-ID or a color-limited MVLAN-ID.

5. The MND of claim 4 further comprising a VLAN tag source coupled to the multicast controller such that the multicast controller may obtain a corresponding VLAN designation from the tag source for use in establishing the sub-regional MVLAN-ID and the color-limited MVLAN-IDs.

6. The MND of claim 5 further comprising a multicast routing table coupled to the multicast controller, the multicast routing table having a corresponding route entry for each multicast group address for which the MND has received a subscription request, each route entry including a list of outgoing interfaces containing the interfaces on which the respective subscription requests were received.

7. The MND of claim 1 wherein the multicast controller is further configured, in response to receiving a Protocol Independent Multicast (PIM) Join request from a neighboring MND for a given multicast group address, to add the IRL designation to the outgoing interface list for the route entry that corresponds to the given multicast group address.

8. The MND of claim 7 wherein the multicast controller is further configured to append the IRL designation to multicast messages that match a route entry having the IRL designation in the outgoing interface list.

9. A computer readable medium containing executable program instructions for efficiently distributing multicast messages within a computer network having at least one region that includes a plurality of virtual local area network (VLAN) domains, the executable program instructions comprising program instructions for:
   establishing a sub-regional Multicast VLAN Identifier (MVLAN-ID) that encompasses a set of the VLAN domains;
   establishing one or more color-limited MVLAN-IDs that encompass all but one of the VLAN domains within the set;
   establishing an inter-router VLAN (IRL) designation for use in communicating with one or more neighboring MNDs;
   in response to receiving a multicast message, determining whether or not the multicast message was received from a VLAN domain included within the set;
   appending the sub-regional MVLAN-ID to the multicast messages provided that it was not received from a VLAN domain included within the set; and
   appending a color-limited MVLAN-ID to the multicast message provided that it was received from a VLAN domain included within the set.

10. A method for distributing multicast messages within a computer network having a plurality of virtual local area network (VLAN) domains, the method comprising the steps of:
    establishing a sub-regional Multicast VLAN Identifier (MVLAN-ID) that encompasses a set of the VLAN domains;
    establishing one or more color-limited MVLAN-IDs, each color-limited MVLAN-ID encompassing all but one of the VLAN domains within the set,
    establishing an inter-router VLAN (IRL) designation for use in communicating with one or more neighboring MNDs;
    appending the sub-regional MVLAN-ID to multicast messages received either from outside of the VLAN region or from a VLAN domain not included with the set of VLAN domains, and
    appending a selected color-limited MVLAN-ID to multicast messages that are received from within the VLAN region, and are associated with a VLAN domain included within the set of VLAN domains.

11. The MND of claim 1 further comprising a VLAN assignment engine that is configured to select one or more VLAN domains for inclusion within the set of VLAN domains.

12. The MND of claim 1 further comprising a multicast routing table coupled to the multicast controller, the multicast routing table having one or more route entries for each multicast group address for which the MND has received a subscription request, each route entry specifying the outgoing interfaces on which the respective subscription requests were received.

13. The method of claim 10 wherein the color-limited MVLAN-ID that is appended to the multicast message corresponds to the color-limited MVLAN-ID that does not encompass the VLAN domain associated with the received multicast message.

14. The method of claim 10 wherein the received multicast message has a source address and a multicast group destination address, the method further comprising the steps of:
    providing a multicast routing table having, for each of a plurality of source address and multicast destination address pairs, a matching outgoing interface list;
    performing a lookup on the multicast routing table using the source address and the multicast group destination address of the received multicast message as indices to identify the matching outgoing interface list; and
    forwarding the received multicast message from each of the outgoing interfaces from the matching list other than the interface on which the multicast message was received.

15. The method of claim 14 further comprising the steps of:
    in response to receiving at a first interface a Join message specifying a multicast destination address, updating the outgoing interface list corresponding to the specified multicast destination address by including the first interface.

16. The method of claim 14 wherein the routing table has an entry for a wildcard source address and a first multicast group destination address pair, the method further comprising the steps of:
    in response to receiving a multicast message specifying the first multicast group destination address and a first source address, creating a new entry in the multicast routing table having the first source address and the first multicast group destination address; and
    copying the outgoing interface list from the routing table entry for the wildcard source address into the new entry created for the first source address.

17. The method of claim 10 further comprising the steps of:
    providing a block of available VLAN designations;
    selecting from the block of available VLAN designations a first VLAN designation for association with the sub-regional MVLAN-ID; and
    selected from the block of available VLAN designations a separate VLAN designation for association with each of the color limited MVLAN-IDs.

18. The method of claim 17 further comprising the step of issuing a plurality of advertisement messages, the advertisement messages configured to associate the first VLAN designation with each VLAN domain within the set of VLAN domains encompassed by the sub-regional MVLAN-ID with which the first VLAN designation is associated.

* * * * *